United States Patent
Suzuki et al.

(10) Patent No.: US 10,279,479 B2
(45) Date of Patent: May 7, 2019

(54) ROBOT CALIBRATING APPARATUS AND ROBOT CALIBRATING METHOD, AND ROBOT APPARATUS AND METHOD OF CONTROLLING ROBOT APPARATUS

(71) Applicant: CANON KABUSHIKI KAISHA, Tokyo (JP)

(72) Inventors: Hideaki Suzuki, Kawasaki (JP); Shingo Amano, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/490,638

(22) Filed: Apr. 18, 2017

(65) Prior Publication Data
US 2017/0217020 A1 Aug. 3, 2017

Related U.S. Application Data

(63) Continuation of application No. 14/488,078, filed on Sep. 16, 2014, now Pat. No. 9,669,545.

(30) Foreign Application Priority Data

Sep. 26, 2013 (JP) .................. 2013-200202

(51) Int. Cl.
*G06F 19/00* (2018.01)
*B25J 9/16* (2006.01)

(52) U.S. Cl.
CPC .......... *B25J 9/1692* (2013.01); *B25J 9/1697* (2013.01); *G05B 2219/39008* (2013.01); *G05B 2219/39044* (2013.01); *G05B 2219/39045* (2013.01)

(58) Field of Classification Search
CPC .......... G02B 2027/014; G02B 27/0172; G02B 27/0176; G02B 2027/0138;
(Continued)

(56) References Cited

U.S. PATENT DOCUMENTS

| 4,954,744 A | 9/1990 | Suzuki |
| 4,956,578 A | 9/1990 | Shimizu |

(Continued)

FOREIGN PATENT DOCUMENTS

| CN | 1843710 | 10/2006 |
| EP | 0 042 960 | 1/1982 |

(Continued)

OTHER PUBLICATIONS

European Search Report dated Nov. 14, 2014 corresponding to European Patent Application No. 14185885.2.

(Continued)

*Primary Examiner* — Ronnie M Mancho
(74) *Attorney, Agent, or Firm* — Venable LLP

(57) ABSTRACT

A robot calibrating apparatus calibrating a command value for a robot body 2 whose position and orientation is controlled based on the command value, includes an operating unit configured to calculate a calibrating function of calibrating the command value, based on the difference between an ideal position and orientation of the robot body 2 and an actual position and orientation of the robot body 2. The ideal position and orientation is operated based on a command value $^R H_T^{com}$ for calibration used during calibration or on a control result value which is a result of control according to the command value. The actual position and orientation is operated based on a measurement value $^R H_T^{meas}$ for calibration acquired by a camera 3 arranged at a prescribed relative position and orientation with respect to the robot body 2 during the robot body 2 being controlled according to the command value for calibration.

22 Claims, 9 Drawing Sheets

(58) Field of Classification Search
CPC .......... G02B 2027/0134; G06F 3/005; G06F 19/3418; G06F 3/0346; B25J 9/1692; B25J 9/1671; B25J 13/00; B25J 9/1697
USPC .................. 700/245, 254; 901/9, 47
See application file for complete search history.

(56) References Cited

U.S. PATENT DOCUMENTS

| | | | |
|---|---|---|---|
| 5,155,416 A | 10/1992 | Suzuki | |
| 5,530,314 A | 6/1996 | Banno | |
| 5,645,462 A | 7/1997 | Banno | |
| 5,650,795 A | 7/1997 | Banno | |
| 5,838,097 A | 11/1998 | Kansanuki | |
| 6,157,137 A | 12/2000 | Suzuki | |
| 6,236,167 B1 | 5/2001 | Yamaguchi | |
| 8,073,528 B2* | 12/2011 | Zhao | B25J 9/1689 600/424 |
| 8,108,072 B2* | 1/2012 | Zhao | G06K 9/3216 382/153 |
| 8,887,582 B2 | 11/2014 | Suzuki | |
| 9,669,545 B2* | 6/2017 | Suzuki | B25J 9/1697 |
| 2003/0144809 A1 | 7/2003 | Puchtler | |
| 2005/0159842 A1* | 7/2005 | Ban | B25J 19/023 700/245 |
| 2011/0043537 A1* | 2/2011 | Dellon | G09B 9/00 345/647 |
| 2011/0143811 A1* | 6/2011 | Rodriguez | G06K 9/00986 455/556.1 |
| 2011/0212717 A1* | 9/2011 | Rhoads | G06F 17/30241 455/420 |
| 2011/0280472 A1 | 11/2011 | Wallack | |
| 2014/0080428 A1* | 3/2014 | Rhoads | H04W 4/70 455/88 |
| 2014/0229005 A1* | 8/2014 | Suzuki | B25J 9/1692 700/254 |
| 2015/0025683 A1* | 1/2015 | Amano | B25J 9/1692 700/254 |

FOREIGN PATENT DOCUMENTS

| | | |
|---|---|---|
| EP | 0 301 527 | 2/1989 |
| EP | 1 671 759 | 6/2006 |
| JP | H04-211807 | 8/1992 |
| JP | 10-63317 | 3/1998 |
| WO | 85/03368 | 8/1985 |

OTHER PUBLICATIONS

Chinese Office Action dated Nov. 13, 2015 in corresponding Chinese Application No. 201410504893.3 9.
Radu Horaud, et al., "Hand-Eye Calibration", International Journal of Robotics Research vol. 14, No. 3, 195-210, Jun. 1995.
Japanese Office Action dated Jun. 20, 2017 during prosecution of related Japanese application No. 2013-200202.

* cited by examiner

ROBOT CALIBRATING APPARATUS AND ROBOT CALIBRATING METHOD, AND ROBOT APPARATUS AND METHOD OF CONTROLLING ROBOT APPARATUS

This application is a continuation of application Ser. No. 14/488,078, filed Sep. 16, 2014, which claims priority to Japanese Application No. JP 2013-200202, filed Sep. 26, 2013, the contents of each of which are incorporated by reference herein.

BACKGROUND OF THE INVENTION

Field of the Invention

The present invention relates to a robot calibrating apparatus and a robot calibrating method in a robot apparatus that includes a multi-jointed arm driven through control on multiple joints and utilizes a visual sensor, and a robot apparatus and a method of controlling a robot apparatus.

Description of the Related Art

Conventionally, a robot apparatus has become widespread which includes a vertical multi-jointed arm, an end effector (hereinafter, called a robot body) and a controlling apparatus for controlling these elements, and further includes a visual sensor (hereinafter, also called a camera) attached to a tip end part of the arm. In this robot apparatus, an object, such as a workpiece, is measured through the camera, and the controlling apparatus operates the position and orientation of the object from a measurement result and controls the position and orientation of the robot body based on the position and orientation of the object acquired through the operation.

In general, a measurement coordinate system adopted by the camera as a reference is different from an operation coordinate system adopted by the robot body as a reference. Accordingly, to acquire an operation target value (command value) of the robot body from a measurement value of the camera, the measurement value of the camera in the measurement coordinate system is required to be transformed into the value in the operation coordinate system. For this coordinate transformation, it is required to perform a preliminary calibrating operation between the measurement coordinate system and the operation coordinate system and acquire a calibration value (a coordinate transformation expression).

As an example of the calibrating operation, for instance, a method has been known that is called a hand-eye calibration method. This method sequentially moves a robot body to multiple positions and orientations, and causes a camera to measure a reference object for calibration at each position and orientation (see Japanese Patent Application Laid-Open No. H10-063317, and Radu Horaud and Fadi Dornaika, "Hand-Eye Calibration", International Journal of Robotics Research Vol. 14, No. 3, 195-210, 1995). This method acquires the relationship between the operation coordinate system and the measurement coordinate system, based on the relationship between a command value for the tip end part of the robot body at each position and orientation of this robot body and a measurement value of a reference object for calibration from the camera, so as to minimize a residual, and then acquires a calibration value.

The coordinate calibrating method described in Japanese Patent Application Laid-Open No. H10-063317 does not consider an operational error of a robot body. In actuality, an operational error occurs owing to mechanical error or bending at an arm. There are further errors that are other than operational error and are specific to a robot body; these errors include an assembly error and lens distortions. These errors cannot be sufficiently suppressed by conventional coordinate calibrating methods, and prevent accuracy from being improved in control of the position and orientation of the robot body.

SUMMARY OF THE INVENTION

It is an object of the present invention to provide a robot calibrating apparatus and a robot calibrating method, and a robot apparatus and a method of controlling a robot apparatus that are capable of improving accuracy in controlling the position and orientation of a robot body by operating the position and orientation of the robot body including an operational error.

According to an aspect of the present invention, a robot calibrating apparatus calibrating a command value for a robot body which includes a multi-jointed arm and whose position and orientation is controlled based on the command value, includes an operating unit configured to calculate a calibrating function of calibrating the command value, based on a difference between an ideal position and orientation of the robot body and an actual position and orientation of the robot body, wherein the ideal position and orientation is operated based on a command value for calibration used during calibration or on a control result value which is a result of control based on the command value, and the actual position and orientation is operated based on a measurement value for calibration acquired by a visual sensor arranged at a prescribed relative position and orientation with respect to the robot body during the robot body being controlled based on the command value for calibration.

According to a further aspect of the present invention, a robot calibrating method of calibrating a command value for a robot body which includes a multi-jointed arm and whose position and orientation is controlled based on the command value or on a control result value which is a result of control according to the command value, includes calculating a calibrating function, the calculating causing an operating unit to calculate a calibrating function of calibrating the command value based on a difference between an ideal position and orientation of the robot body and an actual position and orientation of the robot body, wherein the ideal position and orientation is operated based on a command value for calibration used during calibration, and the actual position and orientation is operated based on a measurement value for calibration acquired by a visual sensor arranged at a prescribed relative position and orientation with respect to the robot body during the robot body being controlled based on the command value for calibration.

According to a still further aspect of the present invention, a robot apparatus, includes: a robot body including a multi-jointed arm; a visual sensor arranged at a prescribed relative position and orientation with respective to the robot body; and a controlling unit configured to operate a command value and control a position and orientation of the robot body, wherein the controlling unit acquires a measurement value through measurement of an object by the visual sensor, generates a temporary command value, based on the measurement value, calibrates the temporary command value using a calibrating function and generates a post-calibration command value, the calibrating function being calculated based on a difference between an ideal position and orientation of the robot body and an actual position and orientation of the robot body, the ideal position and orientation being operated based on a command value for calibration used during calibration or on a control result value which is a result of control based on the command value, the actual position and orientation being operated according to the measurement value for calibration acquired by the visual sensor during control of the robot body based on the command value for calibration, and controls the position and orientation of the robot body according to the post-calibration command value.

According to a still further aspect of the present invention, a method of controlling a robot apparatus including a robot body with a multi-jointed arm, a visual sensor positioned at a prescribed relative position and orientation with respect to the robot body, and a controlling unit configured to operate a command value and control a position and orientation of the robot body, includes: acquiring a measurement value wherein the controlling unit acquires a measurement value through measurement of an object by the visual sensor; generating a temporary command value wherein the controlling unit generates a temporary command value based on the measurement value; calibrating wherein the controlling unit calibrates the temporary command value using a calibrating function and generates a post-calibration command value, the calibrating function being calculated based on a difference between an ideal position and orientation of the robot body and an actual position and orientation of the robot body, the ideal position and orientation being operated based on a command value for calibration used during calibration or on a control result value which is a result of control based on the command value, the actual position and orientation being operated based on a measurement value for calibration acquired by the visual sensor during the robot body being controlled according to the command value for calibration; and controlling a position and orientation wherein the controlling unit controls the position and orientation of the robot body according to the post-calibration command value.

Further features of the present invention will become apparent from the following description of exemplary embodiments with reference to the attached drawings.

DESCRIPTION OF THE EMBODIMENTS

Figure 1:
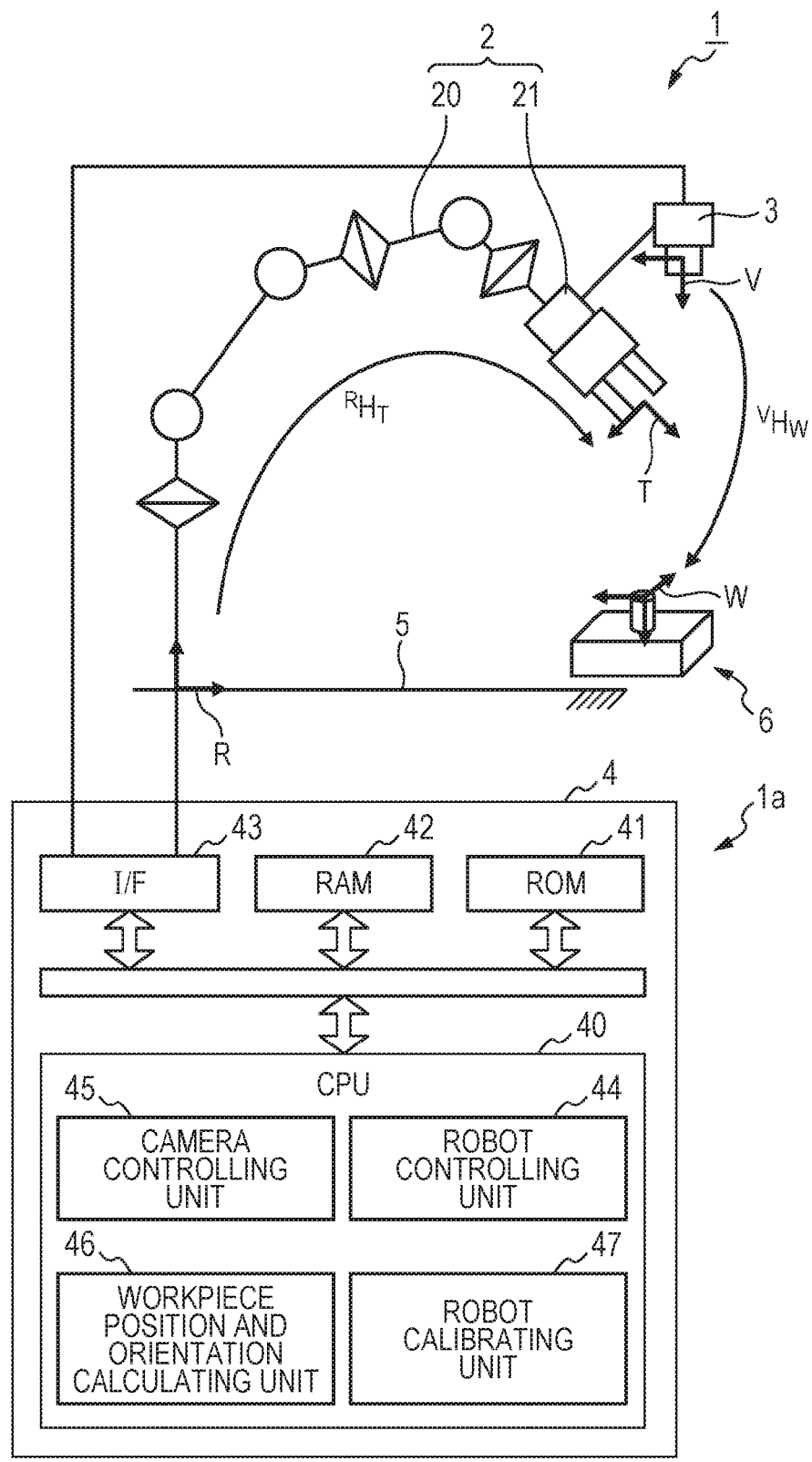
FIG. 1 is a diagram illustrating a schematic configuration of a robot system according to a first embodiment of the present invention.

Preferred embodiments of the present invention will now be described in detail in accordance with the accompanying drawings.

First Embodiment

Before description of a robot system 1 of this embodiment, the definitions of representation of expressions in this specification are described. In this specification, six-degree-of-freedom positions and orientations of a multi-jointed arm 20, a hand 21, a camera 3 and a workpiece 6, which configure the robot system 1, are represented in a three-dimensional coordinate system. Relativized positions and orientations in any two coordinate systems are represented by a coordinate transformation matrix (homogeneous transformation matrix).

First, a coordinate transformation matrix that represents a relativized position and orientation from any coordinate system A to any coordinate system B is represented as $^{A}H_{B}$. The relativized position and orientation indicated by the coordinate transformation matrix $^{A}H_{B}$ is also represented as a relativized position and orientation $^{A}H_{B}$. For instance, in this embodiment, as illustrated in FIG. 1, the relativized position and orientation of an after-mentioned hand tip coordinate system T with reference to an after-mentioned robot coordinate system R is represented as $^{R}H_{T}$. The relativized position and orientation of an after-mentioned workpiece coordinate system W with reference to an after-mentioned camera coordinate system V is represented as $^{V}H_{W}$.

The relativized position and orientation $^{A}H_{B}$ is defined as Expression 1 using a rotation matrix Rot and a translation vector t.

$$^{A}H_{B} = \begin{bmatrix} Rot & t \\ 000 & 1 \end{bmatrix} \quad \text{Expression 1}$$

In Expression 1, the rotation matrix Rot is a 3×3 matrix representing three-dimensional rotation, and the translation vector t is a 3×1 three-dimensional vector. The X, Y and Z components of the amount of translational movement are represented as $t_x$, $t_y$ and $t_z$, respectively. The rotational components about the X, Y and Z axes are represented as $\theta_x$, $\theta_y$ and $\theta_z$, respectively. The rotation matrix Rot is defined as Expression 2. The translation vector t is defined as Expression 3.

$$Rot = Rotz \cdot Roty \cdot Rotx = \begin{bmatrix} \cos\theta_z & -\sin\theta_z & 0 \\ \sin\theta_z & \cos\theta_z & 0 \\ 0 & 0 & 1 \end{bmatrix}$$ Expression 2

$$\begin{bmatrix} \cos\theta_y & 0 & \sin\theta_y \\ 0 & 1 & 0 \\ -\sin\theta_y & 0 & \cos\theta_y \end{bmatrix} \begin{bmatrix} 1 & 0 & 0 \\ 0 & \cos\theta_x & -\sin\theta_x \\ 0 & \sin\theta_x & \cos\theta_x \end{bmatrix}$$

$$t = \begin{bmatrix} t_x \\ t_y \\ t_z \end{bmatrix}$$ Expression 3

In Expression 2, the rotation matrices representing rotational components about the X, Y and Z axes are defined as Rotx, Roty and Rotz, respectively.

Next, as to the characteristics of the coordinate transformation matrix, Expression 4 holds for any of coordinate systems A, B and C.

$$^A H_C = {^A H_B} \cdot {^B H_C}$$ Expression 4

That is, the relativized position and orientation $^A H_C$ of the coordinate system C to the coordinate system A can be acquired by multiplying together the relativized position and orientation $^A H_B$ of the coordinate system B to the coordinate system A and the relativized position and orientation $^B H_C$ of the coordinate system C to the coordinate system B.

To acquire the relativized position and orientation $^B H_A$ of the coordinate system A to the coordinate system B, an inverse matrix is calculated as represented by Expression 5.

$$^B H_A = (^A H_B)^{-1}$$ Expression 5

To acquire the coordinate transformation matrix $^A H_B$ from vectors $(t_x, t_y, t_z, \theta_x, \theta_y, \theta_z)$ that include the amounts of translational movement and the rotational components about the respective axes, representation is intrinsically required to be made using Expressions 1 to 3. However, in this specification, representation is simply made using $H(t_x, t_y, t_z, \theta_x, \theta_y, \theta_z)$ as indicated as Expression 6.

$$H(t_x, t_y, t_z, \theta_x, \theta_y, \theta_z) = {^A H_B}$$ Expression 6

Likewise, an inverse transformation expression for acquiring the vectors $(t_x, t_y, t_z, \theta_x, \theta_y, \theta_z)$ that include the amounts of translational movement and the rotational components about the respective axes from the coordinate transformation matrix $^A H_B$ is represented as $\text{pose}(^A H_B)$ in Expression 7 without using Expressions 1 to 3.

$$\text{pose}(^A H_B) = (t_x, t_y, t_z, \theta_x, \theta_y, \theta_z)$$ Expression 7

(note that $-180 \text{ [deg]} < \theta_x, \theta_y, \theta_z < 180 \text{ [deg]}$)

The transformation of the $\text{pose}(^A H_B)$ in the case of $\theta_y = \pm 90$ [deg] does not have a unique solution. In this case, any one of multiple solutions is calculated. In this embodiment, the target range of the coordinate transformation matrix is a small angle range equivalent to an operational error of the robot body 2. Accordingly, the case of $\theta_y = \pm 90$ [deg] is rare. The adverse effects of the case without unique solution are significantly small.

Next, the robot system 1 according to this embodiment is described.

As illustrated in FIG. 1, the robot system 1 includes a robot apparatus 1a and a robot calibrating unit (operating unit) 47. The robot apparatus 1a includes: a robot body 2 that includes a multi-jointed arm 20 and a hand 21; a monocular camera (visual sensor) 3 provided on the robot body 2; and a controlling apparatus (robot calibrating apparatus) 4 that controls the position and orientation of the robot body 2.

The multi-jointed arm 20 (hereinafter, called an arm) is fixed to a platform 5 fixed with a base end part of the robot body 2. A robot coordinate system R for representing the position and orientation of the arm 20 with reference to the platform 5 is defined at the platform 5. The platform 5 is configured to allow a workpiece (object) 6 to be placed thereon. A workpiece coordinate system W is defined on the workpiece 6 with reference to this workpiece 6.

The arm 20 is a six-axis vertical multi-jointed arm 20 that includes seven links and six joints that link these links in a swingable or rotatable manner. This embodiment thus adopts the six-axis vertical multi-jointed arm 20. However, the configuration is not limited thereto. Alternatively, the number of axes is appropriately changed according to usages and purposes.

Each joint is provided with an output device. This device may be a motor that drives the corresponding joint, or a linear actuator as necessary. Each joint is further provided with input devices. These devices may be an encoder that detects the rotational angle of the motor, a current sensor that detects current to be supplied to the corresponding motor, and a torque sensor that detects the torque of the corresponding joint.

The arm 20 drives each joint in response to the command value output from a robot controlling unit (controlling unit) 44 of the controlling apparatus 4, and adjusts the position and orientation of the hand 21. The robot controlling unit 44 calculates an angle that each joint of the arm 20 is to have with respect to the target value of the relativized position and orientation (command value $^R H_T$) of the after-mentioned hand tip coordinate system T with reference to the robot coordinate system R, and outputs the command value $^R H_T$ to each joint. Furthermore, the robot controlling unit 44 can acquire the current angle information of the joints from the respective encoders, and calculate a control result value, which is a result of control according to the command value $^R H_T$ of an after-mentioned current relativized position and orientation of the hand tip coordinate system T. The after-mentioned robot calibrating unit 47 can use the control result value acquired by the robot controlling unit when acquiring after-mentioned data for calibration, instead of the command value $^R H_T$.

The hand 21 is supported at the tip end part of the arm 20. The position and orientation of the hand 21 is adjusted through an operation of the arm 20. The hand 21 includes, for instance, three fingers that can grip the workpiece 6. The hand tip coordinate system T is defined at the hand 21 with reference to this hand 21. In this embodiment, the hand 21 that can grip the workpiece 6 is thus attached to the arm 20. However, the configuration is not limited thereto. For instance, any of end effectors that can operate the workpiece 6 may be attached. The end effectors may be a mechanism that holds the workpiece 6 instead of gripping, and a tool that processes the workpiece 6.

The camera 3 is supported at the tip end part of the arm 20 or the hand 21. The camera 3 takes an image (performs measurement) in response to a command from a camera controlling unit 45 of the controlling apparatus 4, and transmits image data to the camera controlling unit 45. A camera coordinate system V is defined at the camera 3 with reference to the direction of the optical axis and the vertical and horizontal directions in an imaging field. In this embodiment, the camera 3 is provided to be in a prescribed relative position and orientation with respect to the robot body 2. In this relative position and orientation, the optical axis has an angle of about 45 degree from the longitudinal direction of the hand 21, and is oriented toward the tip end of the hand 21.

The controlling apparatus 4 connected to the robot body 2 may be a computer, and controls the robot body 2. The computer, which configures the controlling apparatus 4, includes, for instance, a CPU 40, a ROM 41 that stores a program for controlling each element, a RAM 42 that temporarily stores data, and an input and output interface circuit (I/F) 43 that allows communication with the robot body 2.

The CPU 40 includes the forgoing robot controlling unit 44 and camera controlling unit 45, and a workpiece position and orientation calculating unit 46. In this embodiment, the controlling apparatus 4 is shared with the robot calibrating apparatus. The CPU 40 of the controlling apparatus 4 has a configuration that includes the robot calibrating unit 47, which is an operating unit of the robot calibrating apparatus.

The camera controlling unit 45 transmits the image data acquired by the camera 3 to the workpiece position and orientation calculating unit 46 of the controlling apparatus 4. The workpiece position and orientation calculating unit 46 performs image processing based on the received image data, and calculates the position and orientation of the workpiece 6. The output value calculated here is data equivalent to the position and orientation $^{V}H_{W}$ of the workpiece coordinate system W with reference to the camera coordinate system V. The workpiece position and orientation calculating unit 46 transmits a processing result to the robot calibrating unit 47.

The robot calibrating unit 47, which is a characteristic part of the present invention, corresponds to the robot calibrating apparatus of the present invention and the operating unit thereof. The robot calibrating unit calculates a calibration value, based on the command value $^{R}H_{T}$ of the position and orientation of the hand 21 in the hand tip coordinate system T acquired from the robot controlling unit 40, and the position and orientation $^{V}H_{W}$ of the workpiece 6 in the workpiece coordinate system W acquired from the workpiece position and orientation calculating unit 46. Furthermore, the robot calibrating unit 47 calculates a calibrating function F for calibrating the command value, based on the difference between an ideal position and orientation of the robot body 2 based on a command value $^{R}H_{T}^{com}$ for calibration and an actual position and orientation of the robot body 2 based on a measurement value $^{R}H_{T'}^{meas}$ for calibration corresponding thereto.

Figure 2:
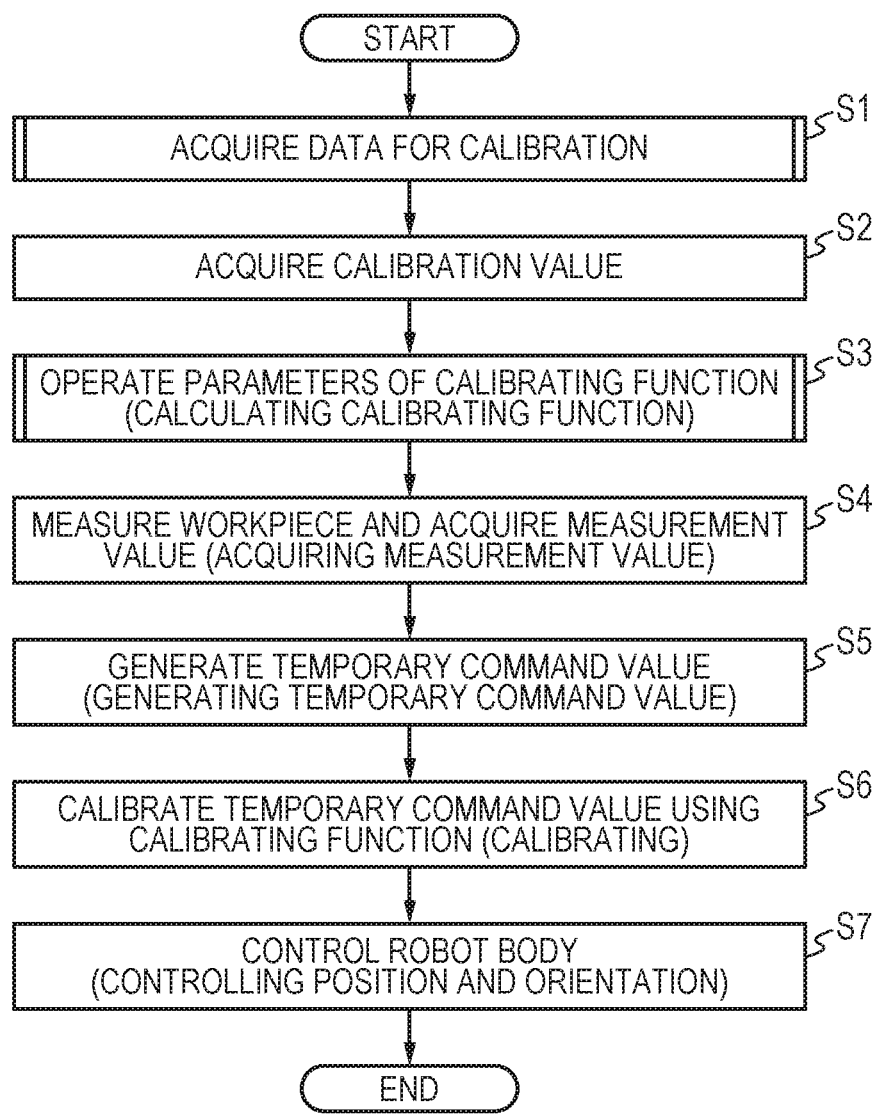
FIG. 2 is a flowchart illustrating operational procedures where the robot system according to the first embodiment of the present invention calibrates the coordinates and controls a robot body.

Procedures of causing the foregoing robot calibrating unit 47 of the robot system 1 to calculate the calibration value and acquiring the calibrating function F are described according to steps S1 to S3 of a flowchart of FIG. 2. In the flowchart illustrated in FIG. 2, steps S1 to S3 illustrate calibrating operation procedures performed at a startup or maintenance of the robot system 1. Steps S4 to S7 illustrate procedures of controlling the position and orientation that are repeatedly performed for each of workpieces 6 sequentially provided in a production line.

Figure 5:
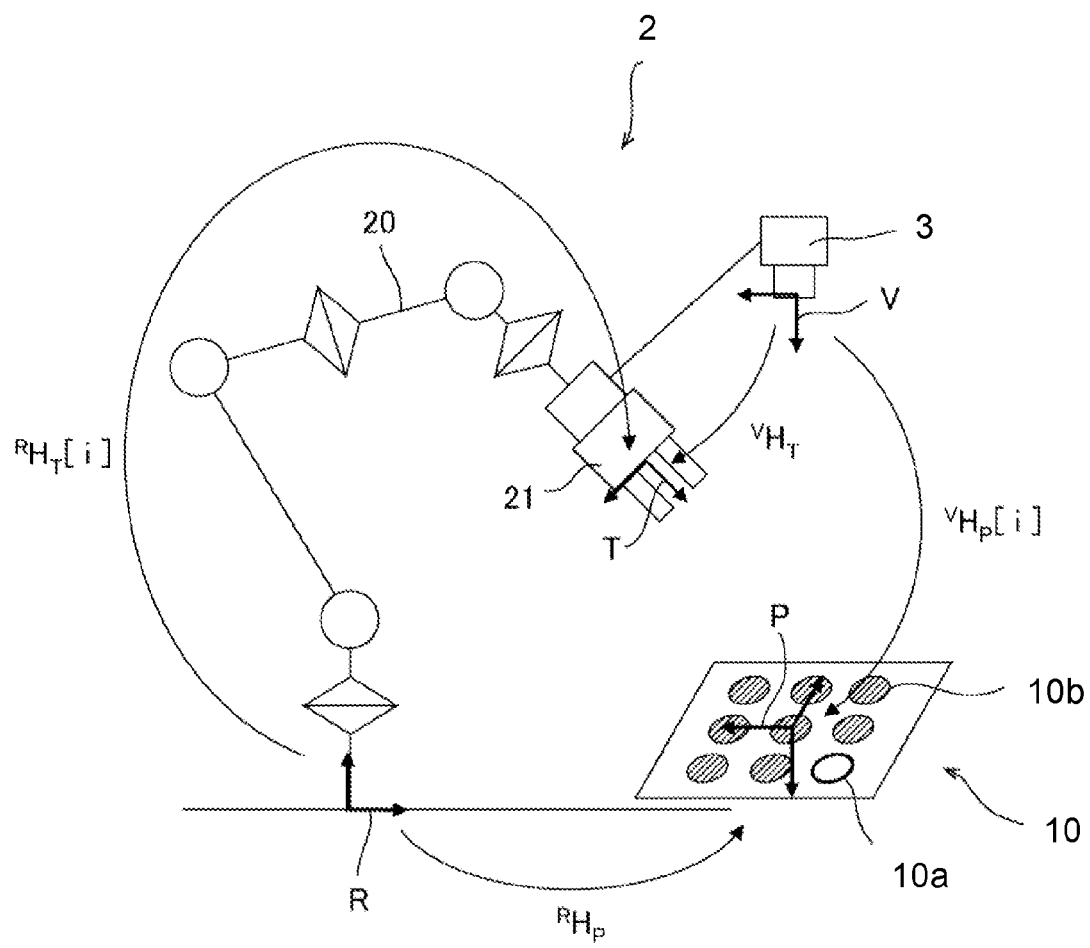
FIG. 5 is a diagram illustrating the position and orientation of the robot body during calculation of a calibration value by the robot system according to the first embodiment of the present invention.
Figure 6:
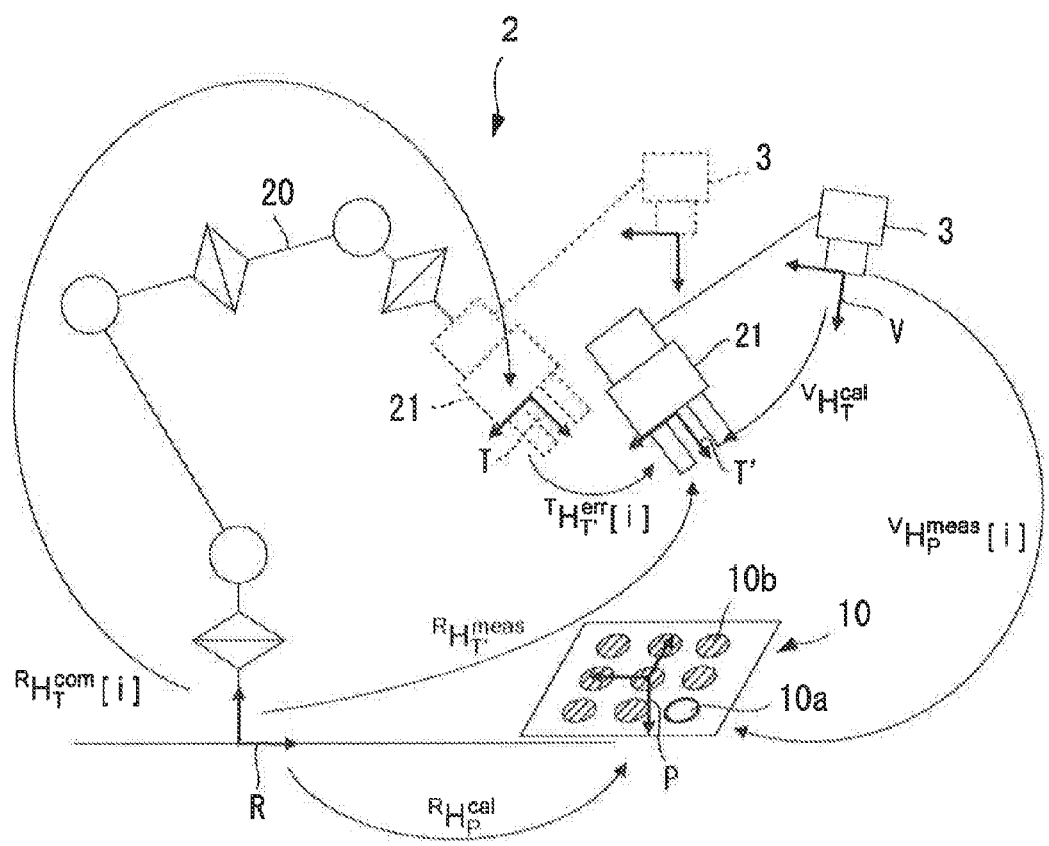
FIG. 6 is a diagram illustrating the position and orientation of the robot body during calculation of an operational error by the robot system according to the first embodiment of the present invention.

First, according to the robot calibrating unit 47, while the robot controlling unit 44 sequentially positions the robot body 2 at multiple positions and orientations, the camera controlling unit 45 causes the camera 3 to sequentially measure a calibrating plate (reference object for calibration) 10 as illustrated in FIG. 5 and FIG. 6. Thus, the robot calibrating unit 47 acquires multiple pieces of data required for calibration, and stores the data (step S1).

Multiple (at least three) circle patterns 10a and 10b having planar shape and a prescribed dimension are arranged and displayed on the surface of the calibrating plate 10. The camera 3 can measure the six-degree-of-freedom position and orientation. The calibrating plate 10 is placed in a visual field where the camera 3 can measure the plane, and relatively fixed to the platform 5 so as not to move even when the robot body 2 moves.

Only one of the multiple circle patterns 10a and 10b on the calibrating plate 10 at a corner is a hollow circle pattern 10a. Other patterns are solid circle patterns 10b. The multiple circle patterns 10a and 10b are disposed not point symmetrically as a whole because of the presence of the hollow circle pattern 10a. Thus, the six-degree-of-freedom position and orientation of the calibrating plate 10 can be uniquely identified. A calibrating plate coordinate system P is defined on the calibrating plate 10 with reference to this calibrating plate 10.

The pattern on the calibrating plate 10 is not limited to such circle patterns. Alternatively, the patterns may be, for instance, a linear grid pattern. For instance, in the case where a stereoscopic camera adopted as the camera 3 can perform three-dimensionally measurement, an object to be a reference object for calibration is not limited to the planar calibrating plate 10. The object may have a three-dimensional shape. Furthermore, an actual workpiece 6 as an object to be operated may be used as a reference object for calibration.

In preliminary procedures before acquiring data for calibration, N positions and orientations for calibration are preliminarily stored in the ROM 41 or RAM 42 of the controlling apparatus 4. An appropriate method of defining positions and orientations for calibration causes the robot body 2 to have various positions and orientations as many as possible within an operation range required for operation of the robot body 2. Although there is variation according to the type of the after-mentioned calibrating function F, the more the number of positions and orientations is, the higher the accuracy is in general. Accordingly, ten to several tens of positions and orientations can be appropriately used. In actuality, variation in positions and orientations that the workpiece 6 has is assumed. Accordingly, the movable range of the robot body 2 may be appropriately set to a wider range so as to accommodate the variation, for improving accuracy.

Figure 3:
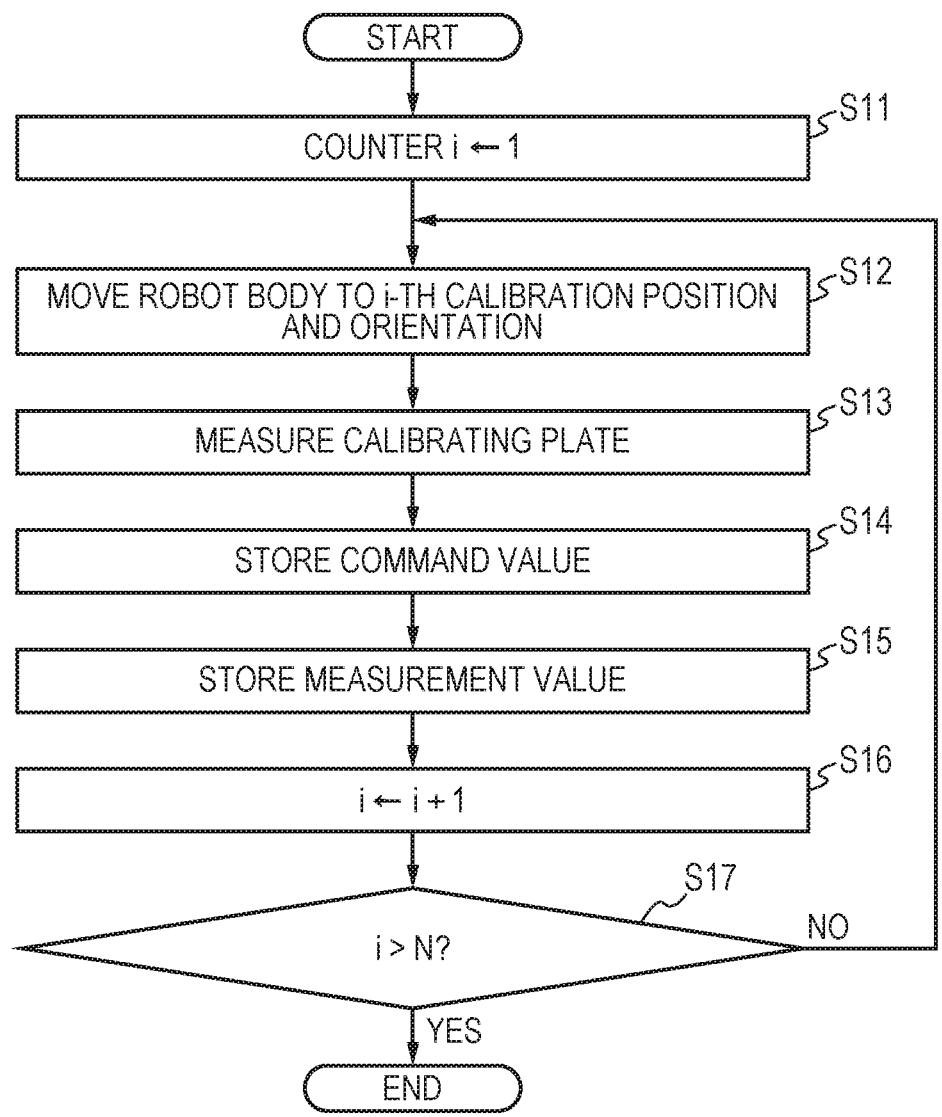
FIG. 3 is a flowchart illustrating operational procedures where the robot system according to the first embodiment of the present invention acquires data for calibration.

Here, procedures of acquiring data for calibration in step S1 are described in detail according to a flowchart illustrated in FIG. 3.

The robot calibrating unit 47 initializes a counter i for a repetitive process to one (step S11). The robot controlling unit 44 positions the robot body 2 at a first calibration position and orientation (i=1) (step S12). According to the robot calibrating unit 47, the camera controlling unit 45 causes the camera 3 to measure the calibrating plate 10 (step S13). Furthermore, according to the robot calibrating unit 47, the workpiece position and orientation calculating unit 46 calculates the position and orientation of the calibrating plate 10 based on the data acquired from the camera 3. That is, the workpiece position and orientation calculating unit 46 calculates the position and orientation $^{V}H_{P}[i]$ of the calibrating plate coordinate system P with reference to the camera coordinate system V.

The robot calibrating unit 47 acquires the command value $^{R}H_{T}[i]$ corresponding to the ideal position and orientation of the tip end part of the hand 21 at a time of positioning of the robot body 2, and stores the position and orientation in the RAM 42 (step S14), and stores the measurement value $^{V}H_{P}[i]$ in the RAM 42 (step S15). The data preliminarily stored as the position and orientation for calibration can be used as the command value $^{R}H_{T}[i]$ of the position and orientation of the tip end part of the hand 21. Alternatively, after the position and orientation of the robot body 2 is determined by the robot controlling unit 44 based on the command value $^R\text{H}_T[i]$, the value of current angle information may be acquired from the encoder at each joint and then a control result value, which is a result of control according to the command value $^R\text{H}_T[i]$, may be calculated. In this case, the robot calibrating unit 47 can use the acquired control result value instead of the command value $^R\text{H}_T[i]$. In general, in the operation of the robot body 2, a small deviation from the target value of control remains. Accordingly, use of the control result value as the data for calibration can achieve higher accuracy than use of the command value $^R\text{H}_T[i]$.

The robot calibrating unit 47 increments the counter i by one (step S16), and determines whether the counter i exceeds the number N of the calibration positions and orientations or not (step S17). If the robot calibrating unit 47 determines that the counter i does not exceed N (step S17, NO), this unit positions the robot body at the next calibration position and orientation, and performs processes analogous to the foregoing processes (steps S12 to S16).

If the robot calibrating unit 47 determines that the counter i exceeds N (step S17, YES), the process of acquiring the data for calibration is finished and the processing returns to the original process. Accordingly, after completion of the process of acquiring the data for calibration (step S1 in FIG. 2), the command values $^R\text{H}_T^{com}[i]$ (i=1, 2, ..., N) at N positions and orientations of the robot body 2 are stored in the RAM 42. Likewise, the N measurement values $^V\text{H}_P^{meas}[i]$ (i=1, 2, ..., N) of the calibrating plate 10 are stored in the RAM 42.

Next, as illustrated in FIG. 5, the robot calibrating unit 47 acquires the relative position and orientation (first calibration value) $^V\text{H}_T$ between the camera coordinate system V and the hand tip coordinate system T, and the relative position and orientation (second calibration value) $^R\text{H}_P$ between the robot coordinate system R and the calibrating plate coordinate system P, through operation (step S2 in FIG. 2). Here, the robot calibrating unit 47 acquires the $^V\text{H}_T$ and $^R\text{H}_P$, based on the previously acquired command value $^R\text{H}_T[i]$ and the measurement value $^V\text{H}_P[i]$, through operation using, for instance, the publicly known hand-eye calibration (see Radu Horaud and Fadi Dornaika, "Hand-Eye Calibration", International Journal of Robotics Research Vol. 14, No. 3, 195-210, 1995).

Specific procedures are hereinafter described. The camera 3 and the hand 21 are fixed to each other, and the robot body 2 and the calibrating plate 10 are fixed to each other. Accordingly, the $^V\text{H}_T$ and $^R\text{H}_P$ are constant irrespective of the position and orientation of the robot body 2. In the case without measurement error of the camera 3 and operational error of the robot body 2, Expression 8 holds for each calibration position and orientation.

$$^V H_P[i] = {}^V H_T \cdot ({}^R H_T[i])^{-1} \cdot {}^R H_P \qquad \text{Expression 8}$$

(i=1, 2, ..., N)

The number of positions and orientations for calibration is N. Accordingly, values are acquired for the respective cases, thereby acquiring N simultaneous Expressions 8. Actually acquired data has an error. Accordingly, the values of $^V\text{H}_T$ and $^R\text{H}_P$ that minimize the error (residual) for N sets of data are calculated by error minimizing calculation, and adopted as calibration values. This calculation method is analogous to the publicly known hand-eye calibration. Accordingly, the detailed description is omitted. The calibration values calculated in step S2 are hereinafter denoted as $^V\text{H}_T^{cal}$ and $^R\text{H}_P^{cal}$ (see FIG. 6).

If the relationship between the coordinate systems is preliminarily known as design values, the design values may be used without use of the data acquired in step S1. The relationship $^V\text{H}_T$ between the camera coordinate system V and the hand tip coordinate system T can also be acquired by directly measuring the hand 21 through the camera 3.

Next, the process of calculating the parameters of the calibrating function F, which is characteristics of this embodiment (step S3, calculating a calibrating function) is described. This calibrating function F is a function that represents the relationship between the command value for the robot body 2 and the actual position and orientation of the robot body 2 according to the command value. More specifically, the relationship between the command value and the actual position and orientation is acquired from the actually measured value of data for calibration data acquired in step S1 during calibration, and, in an actual operation, this relationship is used to predict the actual position and orientation of the hand 21 in the case where the command value is supplied. Such error correction can operate the robot body 2 at high accuracy.

It is assumed that the hand tip position command value is $^R\text{H}_T^{com}$, and the prediction value of the hand tip position and orientation achieved by supplying the command value $^R\text{H}_T^{com}$ to the robot body 2 is $^R\text{H}_T^{pred}$. The calibrating function F is thus defined as Expression 9.

$$^R H_T^{pred} = F({}^R H_T^{com}) \qquad \text{Expression 9}$$

In step S3, parameters for approximately identifying the calibrating function F represented by Expression 9 are calculated. Various functions may be used as the calibrating function F. In this embodiment, a case of using a polynomial expression is described.

Figure 4:
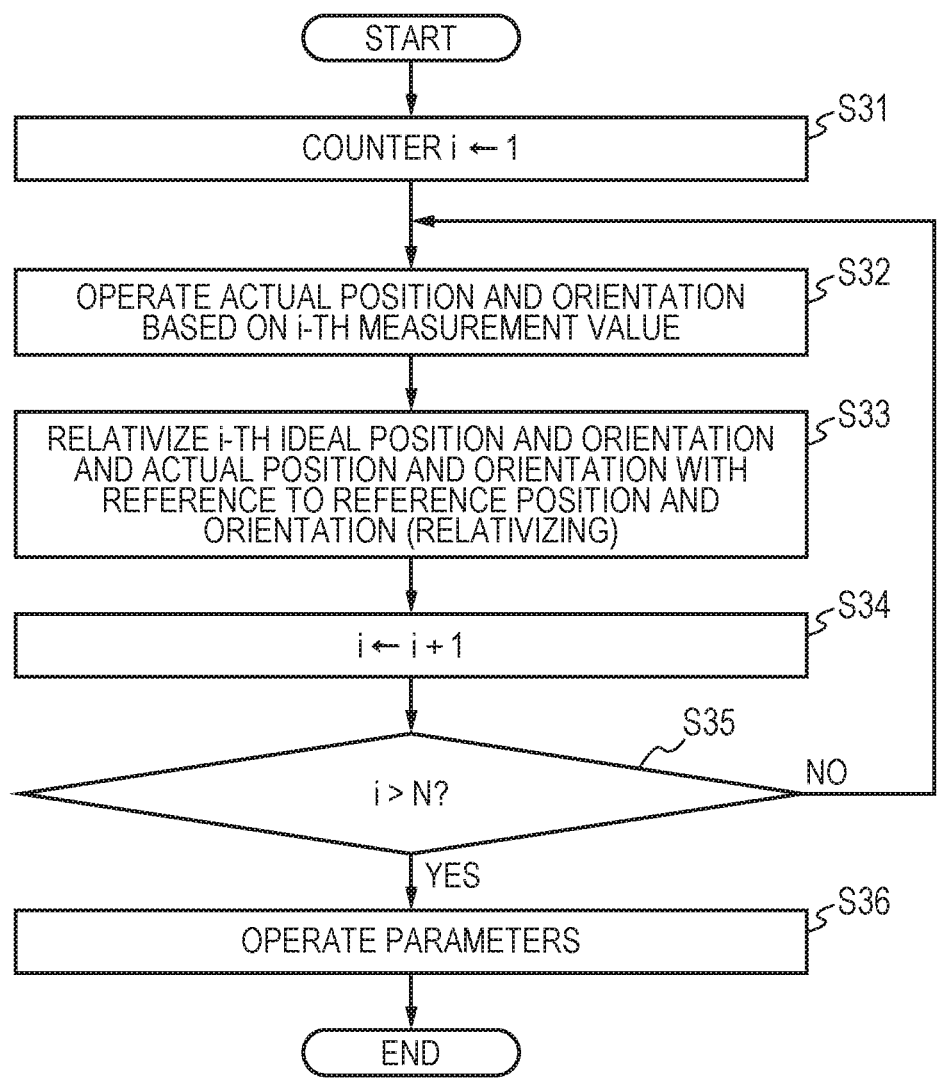
FIG. 4 is a flowchart of operational procedures where the robot system according to the first embodiment of the present invention calculates a calibrating function.

Hereinafter, procedures of calculating the parameters of the calibrating function F, which is a polynomial expression, are described with reference to a flowchart illustrated in FIG. 4.

First, the robot calibrating unit 47 initializes a counter i of a repetitive process to one (step S31). This counter i corresponds to N calibration positions and orientations acquired in step S1. The robot calibrating unit 47 calculates the measurement value $^R\text{H}_{T'}^{meas}[i]$ of the hand-tip-realized position and orientation with respect to the i-th measurement value $^V\text{H}_P^{meas}[i]$ using Expression 10 (step S32).

$$^R H_{T'}^{meas}[i] = {}^R H_P^{cal} \cdot ({}^V H_P^{meas}[i])^{-1} \cdot {}^V H_T^{cal} \qquad \text{Expression 10}$$

(i=1, 2, ..., N)

The measurement value $^R\text{H}_{T'}^{meas}[i]$ is an indicator that is the relationship between the robot coordinate system R and the realized hand tip coordinate system T' for the i-th calibration position and orientation where the measurement value $^V\text{H}_P^{meas}[i]$ by the camera 3 is reflected. If the measurement accuracy of the camera 3 is higher than the operation accuracy of the robot body 2, the measurement value $^R\text{H}_{T'}^{meas}[i]$ is a value where the position and orientation of the robot body 2 actually positioned in the real world is reflected in the command value $^R\text{H}_T^{com}[i]$ of the ideal position and orientation of the robot body 2. That is, the measurement value $^R\text{H}_{T'}^{meas}[i]$ of the hand-tip-realized position and orientation can be regarded as a value where the difference (operational error) $^T\text{H}_{T'}^{err}[i]$ is included in the command value $^R\text{H}_T^{com}[i]$ of the ideal position and orientation.

Next, the robot calibrating unit 47 performs a preprocess for parameter calculation of the calibrating function F; i.e., this unit relativizes the command value $^{R}H_{T}^{com}[i]$ and the measurement value $^{R}H_{T'}^{meas}[i]$ for the i-th calibration position and orientation using a command value $^{R}H_{T0}$ of the reference position and orientation (step S33, relativizing). That is, the robot calibrating unit 47 relativizes the ideal position and orientation and the actual position and orientation for the i-th calibration position and orientation using the reference position and orientation. As represented by the Expression 11, the command value $^{R}H_{T}^{com}[i]$ of the hand tip position and orientation for the i-th calibration position and orientation is relativized using the predetermined command value (reference command value) $^{R}H_{T0}$ of the reference position and orientation of the robot body 2.

$$^{T0}H_{T}^{com}[i]=(^{R}H_{T0})^{-1}\cdot{}^{R}H_{T}^{com}[i] \quad \text{Expression 11}$$

(i=1, 2, . . . , N)

Here, the relativization means conversion of the command value $^{R}H_{T}^{com}[i]$ and the measurement value $^{R}H_{T'}^{meas}[i]$ into a relative value of the position and orientation with respect to the command value $^{R}H_{T0}$ of the reference position and orientation. The command value of the representative position and orientation at a time when the calibration position and orientation is acquired can be used as the command value $^{R}H_{T0}$ of the reference position and orientation.

As represented by Expression 12, the measurement value $^{R}H_{T'}^{meas}[i]$ of the hand-tip-realized position and orientation for the i-th calibration position and orientation is relativized using the command value $^{R}H_{T0}$ of the reference position and orientation.

$$^{T0}H_{T'}^{meas}[i]=(^{R}H_{T0})^{-1}\cdot{}^{R}H_{T'}^{meas}[i] \quad \text{Expression 12}$$

(i=1, 2, . . . , N)

If the rotational component is large when the polynomial function f into which six-degree-of-freedom components (x, y, z, α, β, γ) are input in an after-mentioned process is defined, the function might be discontinuous around ±180° and the accuracy of approximation might be reduced in an after-mentioned process. The process of step S33 can suppress such reduction. Step S33 is a process for suppressing reduction in accuracy of approximation. Accordingly, this process may be omitted in certain conditions of the position and orientation to be calibrated.

The robot calibrating unit 47 then increments the counter i by one (step S34), and determines whether the counter i exceeds the number N of calibration positions and orientations or not (step S35). If the robot calibrating unit 47 determines that counter i does not exceed N (step S35, NO), processes analogous to the foregoing processes are executed for the next calibration position and orientation (steps S32 to S34).

If the robot calibrating unit 47 determines that the counter i exceeds N (step S35, YES), the process of operating the parameters of the polynomial expression is started (step S36). At this point in time, total N groups of the command value $^{T0}H_{T}^{com}[i]$ of the relativized hand tip position and orientation and the measurement value $^{T0}H_{T'}^{meas}[i]$ of the relativized hand-tip-realized position and orientation are calculated for each calibration position and orientation.

In step S36, for acquiring the calibrating function F of Expression 9, the following two conversions are performed as preprocesses. First, as described above, to avoid discontinuity of the rotational component, relativization is performed using the command value $^{R}H_{T0}$ of the reference position and orientation. Secondly, the hand tip position command value $^{R}H_{T}^{com}$ and the prediction value $^{R}H_{T}^{pred}$ of the hand tip position and orientation in Expression 9 are 4×4 homogeneous transformation matrices. The degree of freedom is six. It is difficult to process the matrix with this format in the polynomial expression. Accordingly, the matrix is converted into a format with six components. That is, the calibrating function F is replaced with the polynomial function f represented in Expression 13.

$$\text{Pose}(^{T0}H_{T}^{pred})=f(\text{Pose}(^{T0}H_{T}^{com})) \quad \text{Expression 13}$$

Here, the prediction value $^{T0}H_{T}^{pred}$ of the relativized hand tip position and orientation and the command value $^{T0}H_{T}^{com}$ of the relativized hand tip position and orientation are calculated by Expression 14.

$$^{T0}H_{T}^{pred}=(^{R}H_{T0})^{-1}\cdot{}^{R}H_{T}^{pred}$$

$$^{T0}H_{T}^{com}=(^{R}H_{T0})^{-1}\cdot{}^{R}H_{T}^{com} \quad \text{Expression 14}$$

The expression is deformed by substituting Expression 14 in Expression 13, thereby achieving Expression 15.

$$\text{Pose}((^{R}H_{T0})^{-1}\cdot{}^{R}H_{T}^{pred})=f(\text{Pose}((^{R}H_{T0})^{-1}\cdot{}^{R}H_{T}^{com}))$$

$$(^{R}H_{T0})^{-1}\cdot{}^{R}H_{T}^{pred}=H\{f(\text{Pose}((^{R}H_{T0})^{-1}\cdot{}^{R}H_{T}^{com}))\}$$

$$^{R}H_{T}^{pred}=(^{R}H_{T0})\cdot H\{f(\text{Pose}((^{R}H_{T0})^{-1}\cdot{}^{R}H_{T}^{com}))\} \quad \text{Expression 15}$$

Accordingly, the relationship between the calibrating function F and the polynomial function f is represented by Expression 16.

$$^{R}H_{T}^{pred}=F(^{R}H_{T}^{com})=^{R}H_{T0}\cdot H\{f(\text{Pose}((^{R}H_{T0})^{-1}\cdot{}^{R}H_{T}^{com}))\} \quad \text{Expression 16}$$

In Expression 16, the command value $^{R}H_{T0}$ of the reference position and orientation is known. Accordingly, acquisition of the parameters of the polynomial function f can define the calibrating function F. Thus, the command value $^{R}H_{T}^{com}$ of the relativized hand tip position and orientation, which is to be an input value into the polynomial function f, is converted into the six-degree-of-freedom. The components after conversion are represented as (x, y, z, α, β, γ) in Expression 17.

$$\text{Pose}(^{T0}H_{T}^{com})=(x,y,z,\alpha,\beta,\gamma) \quad \text{Expression 17}$$

The prediction value $^{T0}H_{T}^{pred}$ of the relativized hand tip position and orientation, which is to be an output value of the polynomial function f, is converted into the six-degree-of-freedom. The components after conversion are represented as (x', y', z', α', β', γ') in Expression 18.

$$\text{Pose}(^{T0}H_{T}^{pred})=(x',y',z',\alpha',\beta',\gamma') \quad \text{Expression 18}$$

Furthermore, provided that the components of the polynomial function f are fx, fy, fz, fα, fβ and fγ, the function is represented by Expression 19.

$$\begin{pmatrix} x' \\ y' \\ z' \\ \alpha' \\ \beta' \\ \gamma' \end{pmatrix}^{T} = f(x,y,z,\alpha,\beta,\gamma) = \begin{pmatrix} f_{x}(x,y,z,\alpha,\beta,\gamma) \\ f_{y}(x,y,z,\alpha,\beta,\gamma) \\ f_{z}(x,y,z,\alpha,\beta,\gamma) \\ f_{\alpha}(x,y,z,\alpha,\beta,\gamma) \\ f_{\beta}(x,y,z,\alpha,\beta,\gamma) \\ f_{\gamma}(x,y,z,\alpha,\beta,\gamma) \end{pmatrix}^{T} \quad \text{Expression 19}$$

In this embodiment, the polynomial function f is a polynomial expression of six variables. Thus, x', y' and z' components of the polynomial function f are generally represented as Expression 20.

$$x' = f_x(x, y, z, \alpha, \beta, \gamma) = \sum_{l,m,n,p,q,r \geq 0}^{l+m+n+p+q+r \leq D} (a_{x\_lmnpqr} \cdot x^l y^m z^n \alpha^o \beta^q \gamma^r)$$

$$y' = f_y(x, y, z, \alpha, \beta, \gamma) = \sum_{l,m,n,p,q,r \geq 0}^{l+m+n+p+q+r \leq D} (a_{y\_lmnpqr} \cdot x^l y^m z^n \alpha^o \beta^q \gamma^r)$$

$$z' = f_z(x, y, z, \alpha, \beta, \gamma) = \sum_{l,m,n,p,q,r \geq 0}^{l+m+n+p+q+r \leq D} (a_{z\_lmnpqr} \cdot x^l y^m z^n \alpha^o \beta^q \gamma^r)$$

Expression 20

Likewise, components $\alpha'$, $\beta'$ and $\gamma'$ of the polynomial function f are generally represented as Expression 21.

$$\alpha' = f_\alpha(x, y, z, \alpha, \beta, \gamma) = \sum_{l,m,n,p,q,r \geq 0}^{l+m+n+p+q+r \leq D} (a_{\alpha\_lmnpqr} \cdot x^l y^m z^n \alpha^o \beta^q \gamma^r)$$

$$\beta' = f_\beta(x, y, z, \alpha, \beta, \gamma) = \sum_{l,m,n,p,q,r \geq 0}^{l+m+n+p+q+r \leq D} (a_{\beta\_lmnpqr} \cdot x^l y^m z^n \alpha^o \beta^q \gamma^r)$$

$$\gamma' = f_\gamma(x, y, z, \alpha, \beta, \gamma) = \sum_{l,m,n,p,q,r \geq 0}^{l+m+n+p+q+r \leq D} (a_{\gamma\_lmnpqr} \cdot x^l y^m z^n \alpha^o \beta^q \gamma^r)$$

Expression 21

In Expressions 20 and 21, D denotes the degree of the polynomial function f, and $a_{x\_lmnpqr}$, $a_{y\_lmnpqr}$, $a_{z\_lmnpqr}$, $a_{\alpha\_lmnpqr}$, $a_{\beta\_lmnpqr}$ and $a_{\gamma\_lmnpqr}$ are the coefficients of the polynomial function f, where subscripts l, m, n, o, p and q are integers at least zero. Calculation of the polynomial function f based on N calibration positions and orientations can define the calibrating function F. In this embodiment, for simplification, the case of degree D=1 is described.

The expression of x' of Expression 20 in the case of degree D=1, Expression 22 can be achieved.

$$x' = f_x(x, y, z, \alpha, \beta, \gamma)$$
$$= a_{x\_000000} + a_{x\_100000}x + a_{x\_010000}y + a_{x\_001000}z +$$
$$a_{x\_000100}\alpha + a_{x\_000010}\beta + a_{x\_000001}\gamma$$

Expression 22

Here, for simplification of description, symbols are replaced as described in Expression 23.

$$a_{x\_000000} = a_{x0}$$
$$a_{x\_100000} = a_{x1}$$
$$a_{x\_010000} = a_{x2}$$
$$a_{x\_001000} = a_{x3}$$
$$a_{x\_000100} = a_{x4}$$
$$a_{x\_000010} = a_{x5}$$
$$a_{x\_000001} = a_{x6}$$

Expression 23

Likewise, also for the components y', z', $\alpha'$, $\alpha'$ and $\gamma'$, it is assumed that D=1 and the symbols are replaced. Thus, Expressions 20 and 21 become Expression 24.

$$x' = f_x(x,y,z\alpha,\beta,\gamma) a_{x0} + a_{x1}x + a_{x2}y + a_{x3}z + a_{x4}\alpha + a_{x5}\beta + a_{x6}\gamma$$

$$y' = f_y(x,y,z\alpha,\beta,\gamma) a_{y0} + a_{y1}x + a_{y2}y + a_{y3}z + a_{y4}\alpha + a_{y5}\beta + a_{y6}\gamma$$

$$z' = f_z(x,y,z\alpha,\beta,\gamma) a_{z0} + a_{z1}x + a_{z2}y + a_{z3}z + a_{z4}\alpha + a_{z5}\beta + a_{z6}\gamma$$

$$\alpha' = f_\alpha(x,y,z\alpha,\beta,\gamma) a_{\alpha 0} + a_{\alpha 1}x + a_{\alpha 2}y + a_{\alpha 3}z + a_{\alpha 4}\alpha + a_{\alpha 5}\beta + a_{\alpha 6}\gamma$$

$$\beta' = f_\beta(x,y,z\alpha,\beta,\gamma) a_{\beta 0} + a_{\beta 1}x + a_{\beta 2}y + a_{\beta 3}z + a_{\beta 4}\alpha + a_{\beta 5}\beta + a_{\beta 6}\gamma$$

$$\gamma' = f_\gamma(x,y,z\alpha,\beta,\gamma) a_{\gamma 0} + a_{\gamma 1}x + a_{\gamma 2}y + a_{\gamma 3}z + a_{\gamma 4}\alpha + a_{\gamma 5}\beta + a_{\gamma 6}\gamma$$

Expression 24

Next, the command value $^{T0}H_T^{com}[i]$ of the relativized hand tip position and orientation having previously been calculated, and the measurement value $^{T0}H_T^{mean}[i]$ of the relativized hand-tip-realized position and orientation are converted to have a form of six-degree-of-freedom so as to be substituted into Expression 24. That is, the six components of the converted result of the command value $^{T0}H_T^{com}[i]$ of the relativized hand tip position and orientation are $(x[i], y[i], z[i], \alpha[i], \beta[i], \gamma[i])$. The six components of the converted result of the measurement value $^{T0}H_T^{mean}[i]$ of the relativized hand-tip-realized position and orientation are $(x'[i], y'[i], z'[i], \alpha'[i], \beta'[i], \gamma'[i])$. As a result, Expression 25 can be acquired.

$$\text{Pose}(^{T0}H_T^{com}[i]) = (x[i], y[i], z[i], \alpha[i], \beta[i], \gamma[i])$$

$$\text{Pose}(^{T0}H_T^{meas}[i]) = (x'[i], y'[i], z'[i], \alpha'[i], \beta'[i], \gamma'[i])$$

Expression 25

(i=1, 2, ..., N)

Expression 25 is substituted into Expression 24, thereby acquiring Expression 26.

$$x'[i] = a_{x0} + a_{x1}x[i] + a_{x2}y[i] + a_{x3}z[i] + a_{x4}\alpha[i] + a_{x5}\beta[i] + a_{x6}\gamma[i]$$

$$y'[i] = a_{y0} + a_{y1}x[i] + a_{y2}y[i] + a_{y3}z[i] + a_{y4}\alpha[i] + a_{y5}\beta[i] + a_{y6}\gamma[i]$$

$$z'[i] = a_{z0} + a_{z1}x[i] + a_{z2}y[i] + a_{z3}z[i] + a_{z4}\alpha[i] + a_{z5}\beta[i] + a_{z6}\gamma[i]$$

$$\alpha'[i] = a_{\alpha 0} + a_{\alpha 1}x[i] + a_{\alpha 2}y[i] + a_{\alpha 3}z[i] + a_{\alpha 4}\alpha[i] + a_{\alpha 5}\beta[i] + a_{\alpha 6}\gamma[i]$$

$$\beta'[i] = a_{\beta 0} + a_{\beta 1}x[i] + a_{\beta 2}y[i] + a_{\beta 3}z[i] + a_{\beta 4}\alpha[i] + a_{\beta 5}\beta[i] + a_{\beta 6}\gamma[i]$$

$$\gamma'[i] = a_{\gamma 0} + a_{\gamma 1}x[i] + a_{\gamma 2}y[i] + a_{\gamma 3}z[i] + a_{\gamma 4}\alpha[i] + a_{\gamma 5}\beta[i] + a_{\gamma 6}\gamma[i]$$

Expression 26

(i=1, 2, ..., N)

Here, for instance, N groups of data (i=1, 2, ..., N) are substituted into the expression of x', which can acquire N simultaneous equations as represented by Expression 27.

Expression 27

$$x'[1] = a_{x0} + a_{x1}x[1] + a_{x2}y[1] + a_{x3}z[1] + a_{x4}\alpha[1] + a_{x5}\beta[1] + a_{x6}\gamma[1]$$
$$x'[2] = a_{x0} + a_{x1}x[2] + a_{x2}y[2] + a_{x3}z[2] + a_{x4}\alpha[2] + a_{x5}\beta[2] + a_{x6}\gamma[2]$$
$$\vdots$$
$$x'[N] = a_{x0} + a_{x1}x[N] + a_{x2}y[N] + a_{x3}z[N] + a_{x4}\alpha[N] + a_{x5}\beta[N] + a_{x6}\gamma[N]$$

The simultaneous equations of Expression 27 are organized into a form of a matrix, thereby acquiring Expression 28.

Expression 28

$$\begin{bmatrix} x'[1] \\ x'[2] \\ \vdots \\ x'[N] \end{bmatrix} = \begin{bmatrix} 1 & x[1] & y[1] & z[1] & \alpha[1] & \beta[1] & \gamma[1] \\ 1 & x[2] & y[2] & z[2] & \alpha[2] & \beta[2] & \gamma[2] \\ \vdots & \vdots & \vdots & \vdots & \vdots & \vdots & \vdots \\ 1 & x[N] & y[N] & z[N] & \alpha[N] & \beta[N] & \gamma[N] \end{bmatrix} \begin{bmatrix} a_{x0} \\ a_{x1} \\ a_{x2} \\ a_{x3} \\ a_{x4} \\ a_{x5} \\ a_{x6} \end{bmatrix}$$

In Expression 28, x'[i] and x[i], y[i], z[i], $\alpha$[i], $\beta$[i] and $\gamma$[i] are known, and $a_{x0}$ to $a_{x6}$ are unknown. If at least seven groups among N groups of data are linearly independent, the groups of coefficients $a_{x0}$ to $a_{x6}$ can be acquired by the publicly known least squares method.

Likewise, least-square solutions of components y', z', $\alpha$', $\beta$' and $\gamma$' are also acquired, which can acquire the polynomial function f based on the definitions of Expressions 20, 21 and 24. That is, the calibrating function F can be acquired through the relationship of Expression 16. Thus, completion of steps S1 to S3 illustrated in FIG. 2 finishes the process of calculating the calibrating function F. That is, the robot calibrating unit 47 calculates the ideal position and orientation of the robot body 2, which is operated based on the command value $^R H_T^{com}[i]$ for calibration used during calibration. The robot calibrating unit 47 calculates the actual position and orientation of the robot body 2, which is operated based on the measurement value $^V H_P^{meas}[i]$ for calibration acquired by the camera 3 through controlling the robot body 2 according to the command value $^R H_T^{com}[i]$ for calibration. The robot calibrating unit 47 calculates the calibrating function F based on the difference between the ideal position and orientation and the actual position and orientation of the robot body 2.

Next, procedures of outputting the command value to the robot body 2 using the acquired calibrating function F and moving the hand 21 toward the workpiece 6 and causes this hand to grip the workpiece in the foregoing robot system 1 are described with reference to steps S4 to S7 of the flowchart illustrated in FIG. 2.

First, the robot controlling unit 44 positions the robot body 2 at the position and orientation for measurement, and the camera controlling unit 45 causes the camera 3 to measure the workpiece 6 (step S4, acquiring a measurement value). Here, $^R H_{T1}$ denotes the command value of the position and orientation for measurement for robot body 2, and $^V H_W^{meas}$ denotes the measurement value of the position and orientation of the workpiece 6 measured by the camera 3 according to the command value $^R H_{T1}$.

Next, the robot controlling unit 44 operates and generates a temporary hand tip command value (temporary command value) $^R H_T^{temp}$ based on the measured measurement value $^V H_W^{meas}$ of the position and orientation of the workpiece 6 (step S5, generating a temporary command value). The robot controlling unit 44 operates the temporary hand tip command value $^R H_T^{temp}$ using a known rigid coordinate transformation model, through Expression 29 using the calibration value $^V H_T$.

$$^R H_T^{temp} = {^R H_{T1}} \cdot (^V H_T)^{-1} \cdot {^V H_W^{temp}}$$  Expression 29

The robot controlling unit 44 coordinate-transforms the measurement value $^V H_W^{meas}$ of the position and orientation of the workpiece 6 into the value in the robot coordinate system R through Expression 29 so as to be used as a position and orientation command value for the robot body 2. In Expression 29, the adverse effect of operational error in the robot body 2 is large. Accordingly, the positioning accuracy is low.

Next, the robot controlling unit 44 inputs the temporary hand tip command value $^R H_T^{temp}$ into the calibrating function F, and operates using Expression 30, and generates the prediction value $^R H_T^{pred}$ of the hand tip position and orientation.

$$^R H_T^{pred} = F(^R H_T^{temp}) = {^R H_{T0}} \cdot H\{f(\text{Pose}((^R H_{T0})^{-1} \cdot {^R H_T^{temp}}))\}$$  Expression 30

Here, based on the relativized temporary hand tip command value $^{T0} H_T^{temp}$, a vector is calculated and represented by Expression 31.

$$\text{Pose}(^{T0} H_T^{temp}) = (x, y, z, \alpha, \beta, \gamma)$$  Expression 31

Furthermore, Expression 32 is derived from Expressions 20, 21 and 24.

Expression 32

$$f(x, y, z, \alpha, \beta, \gamma) = \begin{pmatrix} x' \\ y' \\ z' \\ \alpha' \\ \beta' \\ \gamma' \end{pmatrix}^T$$

$$= \begin{pmatrix} f_x(x, y, z, \alpha, \beta, \gamma) \\ f_y(x, y, z, \alpha, \beta, \gamma) \\ f_z(x, y, z, \alpha, \beta, \gamma) \\ f_\alpha(x, y, z, \alpha, \beta, \gamma) \\ f_\beta(x, y, z, \alpha, \beta, \gamma) \\ f_\gamma(x, y, z, \alpha, \beta, \gamma) \end{pmatrix}^T$$

$$= \begin{pmatrix} a_{x0} + a_{x1}x + a_{x2}y + a_{x3}z + a_{x4}\alpha + a_{x5}\beta + a_{x6}\gamma \\ a_{y0} + a_{y1}x + a_{y2}y + a_{y3}z + a_{y4}\alpha + a_{y5}\beta + a_{y6}\gamma \\ a_{z0} + a_{z1}x + a_{z2}y + a_{z3}z + a_{z4}\alpha + a_{z5}\beta + a_{z6}\gamma \\ a_{\alpha 0} + a_{\alpha 1}x + a_{\alpha 2}y + a_{\alpha 3}z + a_{\alpha 4}\alpha + a_{\alpha 5}\beta + a_{\alpha 6}\gamma \\ a_{\beta 0} + a_{\beta 1}x + a_{\beta 2}y + a_{\beta 3}z + a_{\beta 4}\alpha + a_{\beta 5}\beta + a_{\beta 6}\gamma \\ a_{\gamma 0} + a_{\gamma 1}x + a_{\gamma 2}y + a_{\gamma 3}z + a_{\gamma 4}\alpha + a_{\gamma 5}\beta + a_{\gamma 6}\gamma \end{pmatrix}^T$$

The robot controlling unit 44 calculates the prediction value $^R H_T^{pred}$ of the hand tip position and orientation, using the previously calculated polynomial function f. That is, in the case of positioning the robot body 2 using the temporary hand tip command value $^R H_T^{temp}$ the actual hand tip position and orientation to which the operational error of the robot body 2 is added is predicted to be the prediction value $^R H_T^{pred}$ of the hand tip position and orientation. Thus, the robot controlling unit 44 calculates the difference $^T H_T^{err}$ between the temporary hand tip command value and the prediction value $^R H_T^{pred}$ of the hand tip position and orientation; this difference is represented by Expression 33.

$$^T H_T^{err} = (^R H_T^{temp})^{-1} \cdot {^R H_T^{pred}}$$  Expression 33

The robot controlling unit 44 corrects the temporary hand tip command value $^R H_T^{temp}$ using the inverse matrix of the difference $^T H_{T'}^{err}$ so as to cancel the difference $^T H_{T'}^{err}$. Here, provided that the final and complete hand tip command value after correction (post-calibration command value) is the value is $^R H_T^{comp}$, the value is represented by Expression 34.

$$^R H_T^{comp} = {^R H_T^{temp}} \cdot (^T H_{T'}^{err})^{-1} \qquad \text{Expression 34}$$

According to the foregoing process, the robot controlling unit 44 can calibrate the temporary hand tip command value $^R H_T^{temp}$ using the calibrating function F, and acquire the final and complete hand tip command value $^R H_T^{comp}$ (step S6, calibrating).

The robot controlling unit 44 then transmits the final and complete hand tip command value $^R H_T^{comp}$ to the robot body 2, positions the robot body 2, and causes this body to operate (step S7, controlling a position and orientation). In the command value for the robot body 2, the operational error component is corrected by the calibration process. Accordingly, the hand 21 can approach the workpiece 6 at high accuracy, the hand tip coordinate system T matches with the workpiece coordinate system W at high accuracy, which can achieve highly accurate gripping of the workpiece 6 by the hand 21.

As described above, the robot system 1 of this embodiment can calibrate the temporary hand tip command value $^R H_T^{temp}$ to acquire the final and complete hand tip command value $^R H_T^{comp}$, using the calibrating function F calculated based on the difference between the ideal position and orientation and the actual position and orientation of the robot body 2. Accordingly, unlike the conventional hand-eye calibration method, this embodiment can cancel the operational error and the specific error of the robot body 2. This cancellation can improve the accuracy of controlling the position and orientation of the robot body 2.

The robot system 1 of this embodiment has the configuration that does not directly input the measurement value from the camera 3 into the calibrating function F, but inputs the calculated temporary hand tip command value $^R H_T^{temp}$ into the calibrating function F. Even with a possible difference between the measurement value during calibration and the actual measurement value of the workpiece 6, this configuration can appropriately reduce the error. Accordingly, this configuration negates the need to strictly associate the measurement value on the calibrating plate 10 with that on the actual workpiece 6, and can thus improve operability.

In the robot system 1 of this embodiment, the camera 3 is provided on the hand 21. Accordingly, the error between the camera coordinate system V and the hand tip coordinate system T is small, and the robot body 2 can be highly accurately controlled.

The robot system 1 of this embodiment relativizes the command value $^R H_T^{com}$ for the calibration position and orientation and the measurement value $^R H_{T'}^{meas}$ using the command value $^R H_{T0}$ of the reference position and orientation. If the rotational component is large when the polynomial function f into which six-degree-of-freedom components are input is defined, the function might be discontinuous at a singularity around ±180° and the accuracy of approximation might be reduced. The relativization can suppress such reduction, and achieve higher accuracy of controlling the robot body 2.

Second Embodiment

Figure 7:
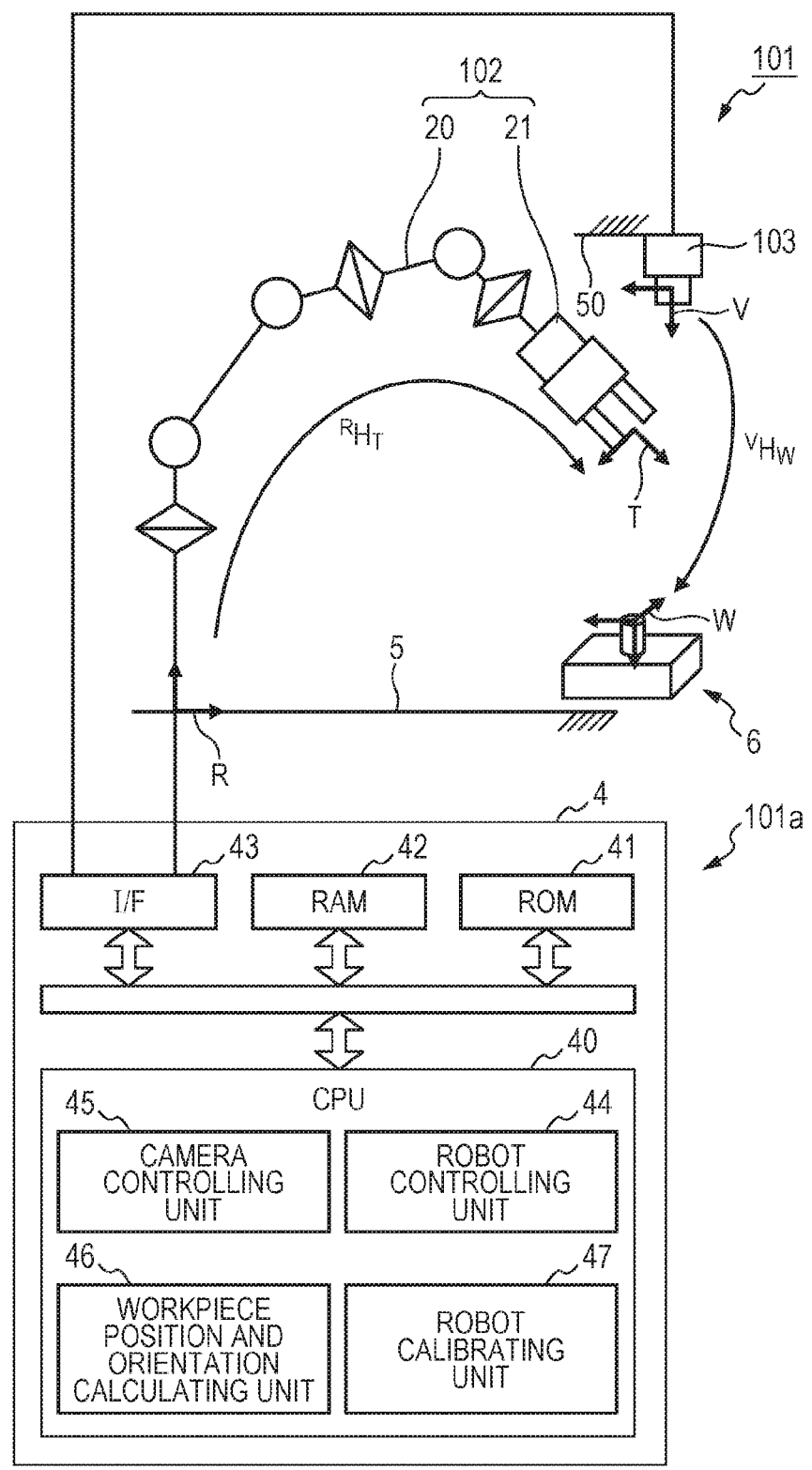
FIG. 7 is a diagram illustrating a schematic configuration of a robot system according to a second embodiment of the present invention.
Figure 8:
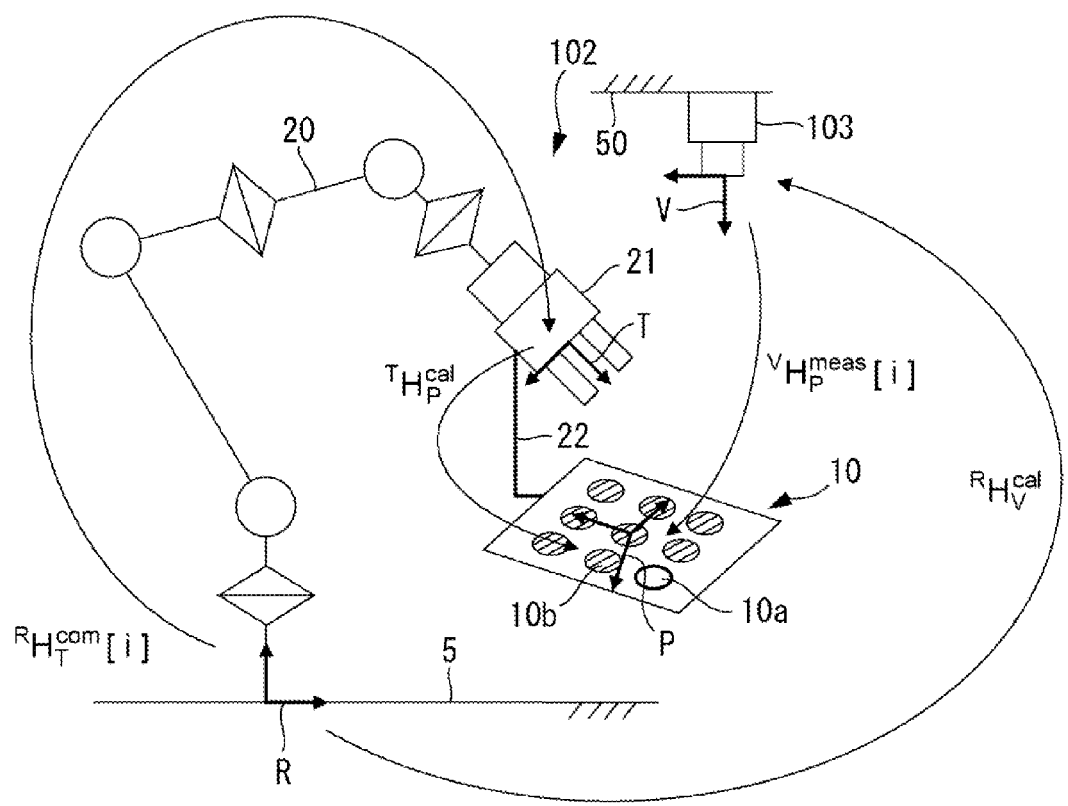
FIG. 8 is a diagram illustrating the position and orientation of a robot body during calculation of a calibration value by the robot system according to the second embodiment of the present invention.

Next, a robot system 101 according to the second embodiment of the present invention is described. As illustrated in FIG. 7 and FIG. 8, the robot system 101 includes a robot apparatus 101a and a robot calibrating unit 47. Unlike the first embodiment, in this robot apparatus 101a, a camera 103 is not arranged on the robot body 102 but is fixed to and supported by an upper support base 50, which is positioned relative to a platform 5, which is fixed to the base end part of a robot body 102. Furthermore, unlike the first embodiment, in the robot apparatus 101a, the calibrating plate 10 is not supported by the platform 5 but is supported by a support member 22, which is positioned relative to the hand 21. Other hardware configurational elements are analogous to the elements of the first embodiment. Accordingly, the same symbols identical to the symbols of the first embodiment are assigned to the respective elements. The description thereof is omitted.

Procedures where the foregoing robot system 101 calculates the calibration value, acquires a calibrating function F, and controls the robot body 102 using the calibrating function F are described with reference to a flowchart illustrated in FIG. 2. The flowchart in FIG. 2 illustrates the operational procedures in the first embodiment. However, this embodiment performs processes in an analogous order. Accordingly, the flowchart is applied to this embodiment. Note that the procedures include points different from those in the first embodiment. Hereinafter, description is made mainly on the different points.

First, while the camera controlling unit 45 sequentially positions the robot body 102 at multiple positions and orientations, the camera 103 sequentially measures the calibrating plate 10 as illustrated in FIG. 8, thereby allowing this unit to acquire multiple pieces of data required for calibration and store the data (step S1). The details of the processes are analogous to those of steps S11 to S17 illustrated in FIG. 3. The camera controlling unit 45 sequentially positions the robot body 102 within a range where the robot body 102 can move and the calibrating plate 10 is kept in the visual field of the camera 103, and measures the calibrating plate 10. The camera controlling unit 45 stores, in the RAM 42, command values $^R H_T^{com}[i]$ of N calibration positions and orientations, and N measurement values $^V H_P^{meas}[i]$.

Next, the robot calibrating unit 47 operates and acquires a calibration value different from the value in the first embodiment. More specifically, the robot calibrating unit 47 operates and acquires the relative position and orientation (third calibration value) $^R H_V$ between the robot coordinate system R and the camera coordinate system V, and the relative position and orientation (fourth calibration value) $^T H_P$ between the hand tip coordinate system T and the calibrating plate coordinate system P (step S2). If there are no measurement error of the camera 103 and no operational error of the robot body 102, Expression 35 holds for each calibration position and orientation.

$$^R H_T^{comp}[i] \cdot {^T H_P} = {^R H_V} \cdot {^V H_P^{meas}[i]} \qquad \text{Expression 35}$$

(i=1, 2, . . . , N)

As with the first embodiment, the number of positions and orientations for calibration is N. Accordingly, values are acquired for the respective cases, thereby acquiring N simultaneous Expressions 35. Actually acquired data has an error. Accordingly, the values of $^T H_P$ and $^R H_V$ that minimize the error (residual) for N sets of data are calculated by error minimizing calculation, and adopted as calibration values. The calibration values calculated in step S2 are hereinafter denoted as $^T H_P^{cal}$ and $^R H_V^{cal}$.

Next, the robot calibrating unit 47 calculates the parameters of the calibrating function F (step S3, calculating a calibrating function). Here, the robot calibrating unit 47 calculates the measurement value $^R H_T^{meas}[i]$ of the handtip-realized position and orientation, for the i-th measurement value $^VH_P^{meas}[i]$ using Expression 36 (corresponding to Expression 10 in the first embodiment). According to Expression 36, processes after calculation of the measurement value $^RH_T^{meas}[i]$ can be advanced in a manner analogous to the processes in first embodiment, thus allowing the parameter for defining the calibrating function F to be calculated.

$$^RH_T^{meas}[i] = {}^RH_V^{cal} \cdot {}^VH_{meas}[i] \cdot ({}^TH_P^{cal})^{-1} \qquad \text{Expression 36}$$

(i=1, 2, . . . , N)

Next, the robot controlling unit 44 positions the robot body 102 at the position and orientation for measurement, and the camera controlling unit 45 causes the camera 103 to measure the workpiece 6 and acquires the measurement value $^VH_W^{meas}$ (step S4, acquiring a measurement value).

Next, the robot controlling unit 44 operates and generates the temporary hand tip command value $^RH_T^{temp}$, based on the measured measurement value $^VH_W^{meas}$ of the position and orientation of the workpiece 6 (step S5, generating a temporary command value). In this embodiment, the robot controlling unit 44 calculates the temporary hand tip command value $^RH_T^{temp}$ using Expression 37 (corresponding to Expression 29 in the first embodiment).

$$^RH_T^{temp}[i] = {}^RH_V^{cal} \cdot {}^VH_W^{meas}[i] \qquad \text{Expression 37}$$

After the temporary hand tip command value $^RH_{temp}$ is acquired, the robot controlling unit 44 calibrates the temporary hand tip command value $^RH_T^{temp}$ using the calibrating function F and acquires the final and complete hand tip command value $^RH_T^{comp}$ (step S6, calibrating) as with the first embodiment.

As with the first embodiment, the robot controlling unit 44 then transmits the final and complete hand tip command value $^RH_T^{comp}$ to the robot body 102, positions the robot body 102 and causes the robot body 102 to operate (step S7, controlling a position and orientation).

As described above, the robot system 101 of this embodiment uses the calibrating function F calculated based on the difference between the ideal position and orientation and the actual position and orientation of the robot body 102 in a manner analogous to that of the first embodiment. Accordingly, the temporary hand tip command value $^RH_T^{temp}$ can be calibrated to acquire the final and complete hand tip command value $^RH_T^{comp}$. The operational error and the specific error of the robot body 102 can thus be canceled. This cancellation can improve the accuracy of controlling the position and orientation of the robot body 102.

According to the robot system 101 of this embodiment, the camera 103 is provided on the upper support base 50. This configuration makes the error between the camera coordinate system V and the robot coordinate system R small, which can achieve high accuracy of controlling the robot body 102.

On the robot systems 1 and 101 in the foregoing first and second embodiments, only the case of the polynomial expression with degree D=1 has been described. The configuration is not limited to this case. For instance, even two or higher order polynomial expressions can be used as the calibrating function F as with the foregoing embodiments. Here, if D of at least two is substituted into the Expressions 20 and 21 and these expressions are expanded, the number of terms becomes large. However, the order of polynomial expression coefficient ($a_{x\_lmnpqr}$ and the like) is one. Accordingly, substitution of the values (x[i], y[i], z[i], α[i], β[i], γ[i]) acquired as calibrating operation data acquires a primary expression in terms of the polynomial expression coefficient. Thus, the coefficient can be identified by the linear least squares method.

On the foregoing robot systems 1 and 101 in the first and second embodiments, only the polynomial expression has been described as the calibrating function F. The expression is not limited thereto. For instance, a simple function other than a polynomial expression, e.g., a spline function, may be used as the calibrating function F.

On the foregoing robot systems 1 and 101 in the first and second embodiments, the description has been made such that the calibrating function F receives the hand tip position command value $^RH_T^{com}$ as an input and outputs the prediction value $^RH_T^{pred}$ of the hand tip position and orientation. However, the function is not limited thereto. For instance, definition of the calibrating function G as its inverse function can also exert analogous advantageous effects. That is, the calibrating function G may be defined as a function that receives the prediction value $^RH_T^{pred}$ of a target hand tip position and orientation as an input and outputs the hand tip position command value $^RH_T^{com}$ for achieving the position and orientation.

In this case, Expression 38 is defined instead of Expression 9, and a process of identifying the parameters of the calibrating function G is performed.

$$^RH_T^{com} = G({}^RH_T^{pred}) \qquad \text{Expression 38}$$

In this case, the process of acquiring and applying the difference as with Expressions 33 and 34 is not required in the process of calibrating the temporary command value by the calibrating function G (step S6). A result acquired by inputting the command value $^RH_T^{temp}$ of the target position and orientation into the calibrating function G can be used as the final and complete hand tip command value $^RH_T^{comp}$.

On the foregoing robot systems 1 and 101 in the first and second embodiments, the case of not necessarily correcting the entire six-degree-of-freedom has been described. However, the configuration is not limited thereto. That is, in the case of usage with the need to correct not entire six-degree-of-freedom, the coefficients calculated for the calibrating function F may be appropriately limited and used. For instance, if correction in the z direction is not required, $a_{z\_lmnpqr}$ may be fixed to zero, only the coefficient $a_{z\_001000}$ concerning the z term may be fixed to one, and other coefficients may be corrected.

Figure 9:
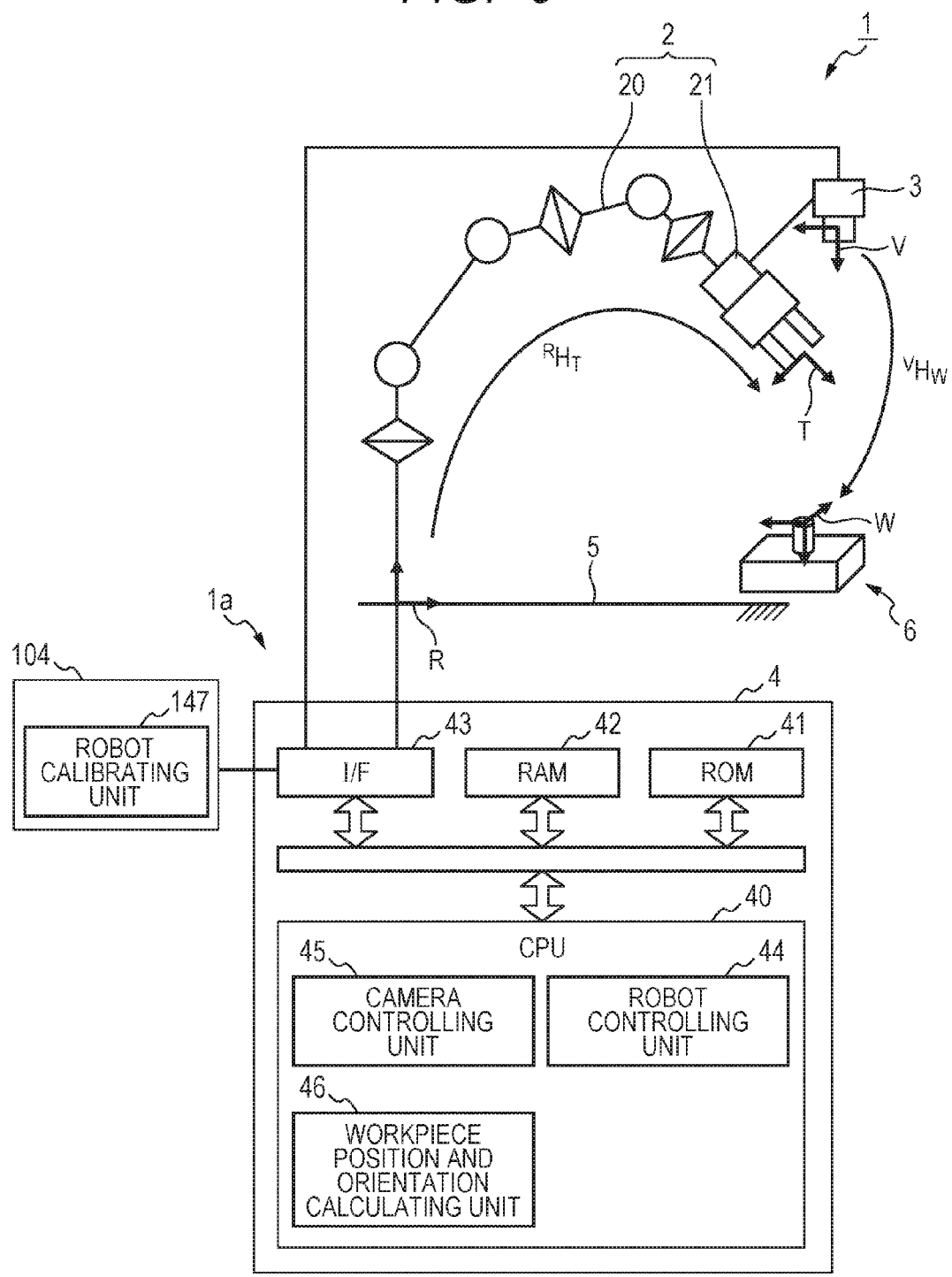
FIG. 9 is a diagram illustrating a schematic configuration of a modification where a controlling apparatus of a robot system according to the first embodiment of the present invention and a robot calibrating apparatus are configured separately from each other.

On the robot systems 1 and 101 in the first and second embodiments, the case has been described where the robot calibrating apparatus is achieved as the robot calibrating unit 47 using the CPU 40 of the controlling apparatus 4. However, the configuration is not limited thereto. For instance, as illustrated in FIG. 9, a robot calibrating apparatus 104 may be provided separately from a controlling apparatus 4. In this case, the robot calibrating apparatus 104 includes a robot calibrating unit (operating unit) 147 in an internal CPU, and is connected to the CPU 40 via the input and output interface circuit 43 of the controlling apparatus 4. A calibration value and a calibrating function F generated by the robot calibrating apparatus 104 is input into the robot controlling unit 44, and used for controlling the robot body 2. This configuration allows the robot calibrating apparatus 104 to be externally attached to the controlling apparatus 4. Accordingly, even an existing controlling apparatus 4 with no robot calibrating unit 47 can use the calibrating function F as with the first and second embodiments.

On the robot systems 1 and 101 in the first and second embodiments, the description has been made in the cases of adopting the monocular cameras 3 and 103 as visual sensors.

However, the configuration is not limited thereto. Alternatively, for instance, a stereoscopic camera or a laser scanner may be used. In the case of adopting a laser scanner, the laser scanner measures a workpiece 6, and a camera controlling unit 45 acquires a measurement result as a group of three-dimensional measurement points. A workpiece position and orientation calculating unit 46 then matches data on the group of three-dimensional measurement points with a three-dimensional CAD model, and calculates the position and orientation of the workpiece 6.

More specifically, the forgoing processing operations in the first and second embodiments are executed by the controlling apparatus 4 and the robot calibrating apparatus 104. Accordingly, the configuration may be achieved by supplying the controlling apparatus 4 with a recording medium that stores a software program for realizing the foregoing functions, and causing the CPU 40 of the controlling apparatus 4 to read the program stored in the recording medium and executes the program. In this case, the program read from the recording medium achieves the functions in each of the foregoing embodiments. Thus, the program itself and the recording medium that stores this program configure the present invention. More specifically, there are a robot calibrating program in each of the robot calibrating units 47 and 147, a program of controlling the robot apparatus in the robot controlling unit 44, and a program of controlling a robot system in each of the robot systems 1 and 101.

In each embodiment, the cases have been described where the computer-readable recording medium is the ROM 41, and the program is stored in the ROM 41. However, the configuration is not limited thereto. The program may be recorded in any recording medium only if the medium is a computer-readable recording medium. For instance, the recording medium for supplying the program may be any of an HDD, an external storing device and a recording disk.

The present invention calculates a calibration function based on the difference between the ideal position and orientation and the actual position and orientation of the robot body. Note that the ideal position and orientation is based on the command value for calibration or the control result value, which is a result of control according to the command value; the actual position and orientation corresponds to the command value. The present invention calibrates the temporary command value based on the calibrating function, and controls the position and orientation of the robot body according to the acquired post-calibration command value. Unlike the conventional hand-eye calibration method, the present invention can thus cancel the operational error and the specific error of the robot body. This cancellation can improve the accuracy of controlling the position and orientation of the robot body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-200202, filed Sep. 26, 2013, which is hereby incorporated by reference herein in its entirety.

What is claimed is:

1. A controlling apparatus for a robot system including a robot body and a camera which is positioned relative to the robot body, the robot body including a plurality of joints and supporting a hand, the controlling apparatus comprising a processing apparatus including a processor configured to execute:
    a process of acquiring a plurality of measurement values of a reference object for calibration of the robot system, by the camera taking images of a plurality of markers included in the reference object for calibration of the robot system while controlling the robot body to move through a plurality of positions and orientations based on a plurality of command values for calibration of the robot system;
    a process of acquiring a first calibration value representing a relationship between a camera coordinate system and a hand tip coordinate system, and a second calibration value representing a relationship between a coordinate system of a base end part of the robot body and a coordinate system of the reference object for calibration of the robot system from the plurality of command values for calibration of the robot system and the plurality of measurement values of the reference object for calibration of the robot system; and
    a process of acquiring a calibrating function that represents a relationship between a command value for the robot body and a prediction value of an actual position and orientation of the robot body, based on a difference between a plurality of positions and orientations of the robot body based on the plurality of command values for calibration of the robot system and the prediction value of the actual position and orientation of the robot body calculated using the plurality of measurement values, the first calibration value and the second calibration value.

2. The controlling apparatus for the robot system according to claim 1, wherein the processor is further configured to execute:
    a process of acquiring a measurement value of an object by taking an image of the object with the camera; and
    a process of calibrating a command value used for controlling a position and orientation of the robot body in operating the robot body with respect to the object, using the measurement value of the object, the first calibration value and the calibrating function.

3. A robot system comprising:
    the controlling apparatus according to claim 1;
    the robot body including the plurality of joints; and
    the camera fixed to the robot body.

4. The robot system according to claim 3, wherein the controlling apparatus is further configured to execute:
    a process of acquiring a measurement value of an object by taking an image of the object with the camera; and
    a process of calibrating a command value used for controlling a position and orientation of the robot body in operating the robot body with respect to the object, using the measurement value of the object, the first calibration value and the calibrating function.

5. The robot system according to claim 4, wherein the controlling apparatus is configured to control the robot body based on the calibrated command value.

6. A calibrating method of calibrating a robot system including a robot body and a camera which is positioned relative to the robot body, the robot body including a plurality of joints and supporting a hand, the method, executed by a processor of a processing apparatus, comprising:
    acquiring a plurality of measurement values of a reference object for calibration of the robot system, by the camera taking images of a plurality of markers included in the reference object for calibration of the robot system while controlling the robot body to move through a plurality of positions and orientations based on a plurality of command values for calibration of the robot system;

acquiring a first calibration value representing a relationship between a camera coordinate system and a hand tip coordinate system and a second calibration value representing a relationship between a coordinate system of a base end part of the robot body and a coordinate system of the reference object for calibration of the robot system from the plurality of command values for calibration of the robot system and the plurality of measurement values of the reference object for calibration of the robot system; and acquiring a calibrating function that represents a relationship between a command value for the robot body and a prediction value of an actual position and orientation of the robot body based on a difference between a plurality of positions and orientations of the robot body based on the plurality of command values for calibration of the robot system and the prediction value of the actual position and orientation of the robot body calculated using the plurality of measurement values, the first calibration value and the second calibration value.

7. The calibrating method of calibrating the robot system according to claim 6, wherein the method further comprises:
acquiring a measurement value of an object by taking an image of the object with the camera; and
calibrating a command value used for controlling a position and orientation of the robot body in operating the robot body with respect to the object, using the measurement value of the object, the first calibration value and the calibrating function.

8. A non-transitory computer-readable recording medium storing a program for executing each step of the calibrating method of calibrating the robot system according to claim 6.

9. A controlling method of controlling a robot system including a robot body and a camera which is positioned relative to the robot body, the robot body including a plurality of joints and supporting a hand, a processor of a controlling apparatus executing the method, comprising:
acquiring a plurality of measurement values of a reference object for calibration of the robot system, by the camera taking images of a plurality of markers included in the reference object for calibration of the robot system while controlling the robot body to move through a plurality of positions and orientations based on a plurality of command values for calibration of the robot system;
acquiring a first calibration value representing relationship between a camera coordinate system and a hand tip coordinate system, and a second calibration value representing a relationship between a coordinate system of a base end part of the robot body and a coordinate system of the reference object for calibration of the robot system from the plurality of command values for calibration of the robot system and the plurality of measurement values of the reference object for calibration of the robot system; and
acquiring a calibrating function that represents a relationship between a command value for the robot body and a prediction value of an actual position and orientation of the robot body based on a difference between a plurality of positions and orientations of the robot body based on the plurality of command values for calibration of the robot system and the prediction value of the actual position and orientation of the robot body calculated using the plurality of measurement values, the first calibration value and the second calibration value.

10. The controlling method of controlling the robot system according to claim 9, wherein method further comprises:
acquiring a measurement value of an object by taking an image of the object with the camera; and
calibrating a command value used for controlling a position and orientation of the robot body in operating the robot body with respect to the object, using the measurement value of the object, the first calibration value and the calibrating function.

11. The controlling apparatus for the robot system according to claim 1, wherein the calibrating function includes a rotational component.

12. A controlling apparatus for a robot system including a robot body and a camera which is positioned relative to a platform to which a base end part of the robot body is fixed, the robot body including a plurality of joints and supporting a hand, the controlling apparatus comprising a processing apparatus including a processor configured to execute:
a process of acquiring a plurality of measurement values of a reference object for calibration of the robot system, by the camera taking images of a plurality of markers included in the reference object for calibration of the robot system while controlling the robot body supporting in the reference object for calibration of the robot system to move through a plurality of positions and orientations based on a plurality of command values for calibration of the robot system;
a process of acquiring a third calibration value representing a relationship between a camera coordinate system and a coordinate system of the base end part of the robot body and a fourth calibration value representing a relationship between a hand tip coordinate system and a coordinate system of the reference object for calibration of the robot system from the plurality of command values for calibration of the robot system and the plurality of measurement values of the reference object for calibration of the robot system; and
a process of acquiring a calibrating function that represents a relationship between a command value for the robot body and a prediction value of an actual position and orientation of the robot body, based on a difference between a plurality of positions and orientations of the robot body based on the plurality of command values for calibration of the robot system and the prediction value of the actual position and orientation of the robot body calculated using the plurality of measurement values, the third calibration value and the fourth calibration value.

13. The controlling apparatus for the robot system according to claim 12, wherein the processor is further configured to execute:
a process of acquiring a measurement value of an object by taking an image of the object with the camera; and
a process of calibrating a command value used for controlling a position and orientation of the robot body in operating the robot body with respect to the object, using the measurement value of the object, the third calibration value and the calibrating function.

14. The controlling apparatus for the robot system according to claim 12, wherein the calibrating function includes a rotational component.

15. A robot system comprising:
the controlling apparatus according to claim 12;
the robot body including the plurality of joints; and
the camera which is positioned relative to the platform to which the base end part of the robot body is fixed.

16. The robot system according to claim 15, wherein the controlling apparatus is further configured to execute:
a process of acquiring a measurement value of an object by taking an image of the object with the camera; and
a process of calibrating a command value used for controlling a position and orientation of the robot body in operating the robot body with respect to the object, using the measurement value of the object, the third calibration value and the calibrating function.

17. The robot system according to claim 16, wherein the controlling apparatus is configured to control the robot body based on the calibrated command value.

18. A calibrating method of calibrating a robot system including a robot body and a camera which is positioned relative to a platform to which a base end part of the robot body is fixed, the robot body including a plurality of joints and supporting a hand, the method, executed by a processor of a processing apparatus, comprising:
acquiring a plurality of measurement values of a reference object for calibration of the robot system, by the camera taking images of a plurality of markers included in the reference object for calibration of the robot system while controlling the robot body supporting in the reference object for calibration of the robot system to move through a plurality of positions and orientations based on a plurality of command values for calibration of the robot system;
acquiring a third calibration value representing a relationship between a camera coordinate system and a coordinate system of the base end part of the robot body and a fourth calibration value representing a relationship between a hand tip coordinate system and a coordinate system of the reference object for calibration of the robot system from the plurality of command values for calibration of the robot system and the plurality of measurement values of the reference object for calibration of the robot system; and
acquiring a calibrating function that represents a relationship between a command value for the robot body and a prediction value of an actual position and orientation of the robot body, based on a difference between a plurality of positions and orientations of the robot body based on the plurality of command values for calibration of the robot system and the prediction value of the actual position and orientation of the robot body calculated using the plurality of measurement values, the third calibration value and the fourth calibration value.

19. The calibrating method of calibrating the robot system according to claim 18, wherein the method further comprises:
acquiring a measurement value of an object by taking an image of the object with the camera; and
calibrating a command value used for controlling a position and orientation of the robot body in operating the robot body with respect to the object, using the measurement value of the object, the third calibration value and the calibrating function.

20. A non-transitory computer-readable recording medium storing a program for executing each step of the calibrating method of calibrating the robot system according to claim 18.

21. A controlling method of controlling a robot system including a robot body and a camera which is positioned relative to a platform to which a base end part of the robot body is fixed, the robot body including a plurality of joints and supporting a hand, a processor of a controlling apparatus executing the method, comprising:
acquiring a plurality of measurement values of a reference object for calibration of the robot system, by the camera taking images of a plurality of markers included in the reference object for calibration of the robot system while controlling the robot body supporting in the reference object for calibration of the robot system to move through a plurality of positions and orientations based on a plurality of command values for calibration of the robot system;
acquiring a third calibration value representing a relationship between a camera coordinate system and a coordinate system of the base end part of the robot body and a fourth calibration value representing a relationship between a hand tip coordinate system and a coordinate system of the reference object for calibration of the robot system from the plurality of command values for calibration of the robot system and the plurality of measurement values of the reference object for calibration of the robot system; and
acquiring a calibrating function that represents a relationship between a command value for the robot body and a prediction value of an actual position and orientation of the robot body, based on a difference between a plurality of positions and orientations of the robot body based on the plurality of command values for calibration of the robot system and the prediction value of the actual position and orientation of the robot body calculated using the plurality of measurement values, the third calibration value and the fourth calibration value.

22. The controlling method of controlling the robot system according to claim 21, wherein the method further comprises:
acquiring a measurement value of an object by taking an image of the object with the camera; and
calibrating a command value used for controlling a position and orientation of the robot body in operating the robot body with respect to the object, using the measurement value of the object, the third calibration value and the calibrating function.

* * * * *